United States Patent
Maziers

(10) Patent No.: US 9,862,169 B2
(45) Date of Patent: Jan. 9, 2018

(54) ROTOMOULDED ARTICLES

(71) Applicant: TOTAL RESEARCH & TECHNOLOGY FELUY, Seneffe (BE)

(72) Inventor: Eric Maziers, Seneffe (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 213 days.

(21) Appl. No.: 14/769,466

(22) PCT Filed: Mar. 4, 2014

(86) PCT No.: PCT/EP2014/054180
§ 371 (c)(1),
(2) Date: Aug. 21, 2015

(87) PCT Pub. No.: WO2014/135541
PCT Pub. Date: Sep. 12, 2014

(65) Prior Publication Data
US 2016/0009058 A1    Jan. 14, 2016

(30) Foreign Application Priority Data

Mar. 5, 2013 (EP) .................................... 13157828

(51) Int. Cl.
| | |
|---|---|
| *B29C 41/04* | (2006.01) |
| *B32B 27/08* | (2006.01) |
| *B32B 27/32* | (2006.01) |
| *B32B 27/36* | (2006.01) |
| *C08L 23/00* | (2006.01) |
| *C08L 23/08* | (2006.01) |
| *C08L 67/04* | (2006.01) |
| *C08L 77/12* | (2006.01) |
| *B29C 41/00* | (2006.01) |
| *B29C 41/22* | (2006.01) |
| *B32B 27/06* | (2006.01) |
| *C08J 5/00* | (2006.01) |
| *C08L 23/04* | (2006.01) |
| *C08L 67/02* | (2006.01) |
| *B29K 67/00* | (2006.01) |
| *B29L 31/30* | (2006.01) |

(52) U.S. Cl.
CPC ............ *B32B 27/08* (2013.01); *B29C 41/003* (2013.01); *B29C 41/04* (2013.01); *B29C 41/22* (2013.01); *B32B 27/065* (2013.01); *B32B 27/32* (2013.01); *B32B 27/36* (2013.01); *C08J 5/00* (2013.01); B29K 2023/06 (2013.01); B29K 2067/046 (2013.01); B29L 2031/3005 (2013.01); B32B 2250/24 (2013.01); B32B 2266/025 (2013.01); B32B 2270/00 (2013.01); B32B 2439/00 (2013.01); B32B 2605/08 (2013.01); *C08J 2323/06* (2013.01); *C08J 2423/08* (2013.01); *C08J 2467/04* (2013.01); *C08L 23/04* (2013.01); *C08L 23/0876* (2013.01); *C08L 67/02* (2013.01); *C08L 67/04* (2013.01); *C08L 77/12* (2013.01)

(58) Field of Classification Search
CPC ...... C08L 23/00; C08L 23/04; C08L 23/0876; C08L 67/02; C08L 67/04; C08L 77/12
See application file for complete search history.

(56) References Cited

U.S. PATENT DOCUMENTS

| | | | |
|---|---|---|---|
| 3,264,272 A | 8/1966 | Watkin | |
| 3,355,319 A | 11/1967 | Watkin | |
| 3,404,134 A | 10/1968 | Watkin | |
| 3,936,565 A * | 2/1976 | Good | B29C 44/14 264/45.4 |
| 4,131,731 A | 12/1978 | Lai et al. | |
| 5,053,485 A | 10/1991 | Nieuwenhuis et al. | |
| 5,053,522 A | 10/1991 | Muller | |
| 5,117,008 A | 5/1992 | Bhatia et al. | |
| 2009/0223955 A1 | 9/2009 | Maziers | |
| 2011/0166294 A1* | 7/2011 | Brusson | C08L 23/04 525/174 |
| 2012/0211927 A1 | 8/2012 | Li et al. | |
| 2012/0214944 A1 | 8/2012 | Li et al. | |

FOREIGN PATENT DOCUMENTS

| | | |
|---|---|---|
| EP | 2714769 A1 | 4/2014 |
| WO | 1998002480 A1 | 1/1998 |
| WO | 101171294 A | 4/2008 |
| WO | 2008037772 A1 | 4/2008 |
| WO | 101784602 A | 7/2010 |
| WO | 2010081887 A1 | 7/2010 |
| WO | 2010097463 A1 | 9/2010 |
| WO | 2011144625 A1 | 11/2011 |

OTHER PUBLICATIONS

Office Action issued in Chinese Patent Application No. 201480011789.9, dated Oct. 8, 2016, 19 pages.
International Search Report issued in PCT/EP2014/054180, dated May 16, 2014, 4 pages.
Plastics Additives Handbook, ed. H. Zweifel, 5th edition, 2001, Hanser Publishers.

* cited by examiner

Primary Examiner — Ramsey Zacharia
(74) Attorney, Agent, or Firm — Albert Shung

(57) ABSTRACT

A rotomolded article having one or more layers includes a layer A. The layer A includes from 50 to 99.4 wt % of a polyolefin; from 0.5 to 50 wt % of a polyester; from 0.1 to 20 wt % of a co- or ter-polymer; and from 0.1 to 20 wt % of an ionomer.

17 Claims, 9 Drawing Sheets

ROTOMOULDED ARTICLES

CROSS-REFERENCE TO RELATED APPLICATIONS

This application is a National Stage Entry of PCT/EP2014/054180, filed on Mar. 4, 2014, which claims priority from EP 13157828.8, filed on Mar. 5, 2013, the entireties of which are incorporated herein by reference.

FIELD OF THE INVENTION

The invention pertains to polyolefin- and polyester-comprising rotomoulded articles.

BACKGROUND OF THE INVENTION

The process of rotational moulding, also called rotomoulding, of plastic has been known since the 1940s for the preparation of hollow plastic articles.

This process consists of adding a thermoplastic polymer into a mould, rotating the mould so that all the points of the internal surface of the mould are in contact with the polymer while heating the mould, so as to deposit the aforementioned molten polymer on the internal surface of the mould. Thereafter, a stage of cooling allows the solidification of the plastic article, which is then removed from the mould.

Rotational moulding is advantageous because it avoids applying stress and strain to the plastic, which generally occurs in other transformations, for example in injection moulding. Indeed, the plastic does not undergo malaxation or compaction as in an extruder or in injection moulding. Rotational moulding is particularly suitable for preparing large-sized articles, such as furniture, tanks, drums, reservoirs etc.

The most commonly used polymer in rotational moulding is polyethylene, but other polymers such as vinyl polychlorides (PVC), polyamides, polycarbonates and polypropylenes can also be used. However, alone, all of these polymers tend to shrink somewhat and deform within the mould, which causes considerable withdrawal from the mould and non-uniform wall thicknesses. In addition, these polymers, used alone, are characterized either by slow coalescence, or by a raised melting point, which increases the duration of the production cycle. Polyesters, on the other hand, often lack in good thermal and mechanical properties.

There thus exists a need to produce articles by rotational moulding with polymer compositions, which coalesce more rapidly and which make it possible to obtain articles with minimal shrinkage and warpage.

SUMMARY OF THE INVENTION

The object of this invention is thus to provide rotationally moulded (rotomoulded) articles comprising polyolefin having less shrinkage and/or warpage. Another object of this invention is to provide rotomoulded articles having a uniform wall thickness. Another object of this invention is to provide rotomoulded articles presenting a good aspect of internal and external surfaces, without any bubbles, ripples, or other defects. Another object of this invention is to provide rotomoulded articles presenting a good dispersion of polyester in the polyolefin matrix. Another object of this invention is to provide rotomoulded articles with good mechanical properties, in particular improved impact strength. Another object of this invention is to provide rotomoulded articles with good mechanical properties, in particular stiffness.

At least one of the objects mentioned above is carried out with the present invention.

The applicant found in a surprising way that by using a polyester, for example poly(lactic acid) together with a polyolefin, for example polyethylene, together with a co- or ter-polymer, and an ionomer, the disadvantages mentioned above can be overcome.

In a first aspect, the invention provides a rotomoulded article comprising one or more layers wherein a layer A comprises:
- from 50 to 99.5 wt % of a polyolefin, preferably from 60 to 99.4 wt %;
- from 0.5 to 50 wt % of a polyester, wherein said polyester is an aliphatic polyester selected from poly(lactic acid), polyhydroxyalkanoate, polycaprolactone, copolyesters and polyesteramides; preferably from 1 to 30 wt %;
- from 0.1 to 20 wt % of a co- or ter-polymer, comprising:
  (a) 50 to 99.9 wt % of an ethylene or a styrene monomer,
  (b) 0.1 to 50 wt % of an unsaturated anhydride-, epoxide- or carboxylic acid-containing monomer,
  (c) 0 to 50 wt % (meth)acrylic ester monomer; and
- from 0.1 to 20 wt % of an ionomer.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, which illustrates, by way of example, the principles of the invention.

DETAILED DESCRIPTION OF THE INVENTION

Figure 1:
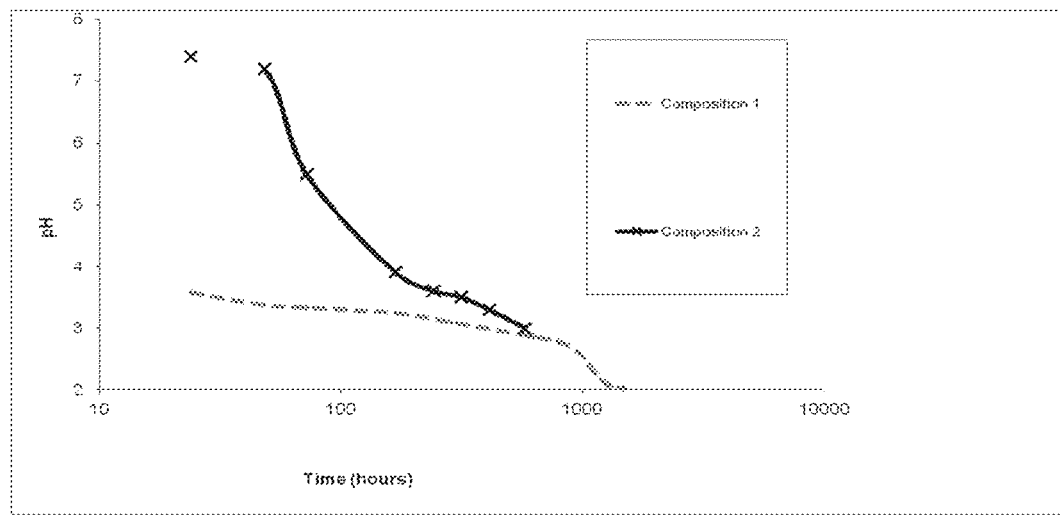
FIG. 1 represents a graph plotting the pH of compositions 1 and 2 when added to distilled water as a function of time.

When describing the article of the invention, the terms used are to be construed in accordance with the following definitions, unless a context dictates otherwise.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The recitation of numerical ranges by endpoints includes all numbers and fractions subsumed within the respective ranges, as well as the recited endpoints.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

All documents cited in the present specification are hereby incorporated by reference in their entirety.

The present invention provides a rotomoulded article comprising at least one layer A comprising:
   from 50 to 99.5 wt % of a polyolefin, preferably from 60 to 99.4 wt % of a polyolefin, based on the total weight of the layer A;
   from 0.5 to 50 wt % of a polyester, wherein said polyester is an aliphatic polyester selected from poly(lactic acid), polyhydroxyalkanoate, polycaprolactone, copolyesters and polyesteramides; preferably from 1 to 30 wt % based on the total weight of the layer A;
   from 0.1 to 20 wt % of a co- or ter-polymer, comprising:
      (a) 50 to 99.9 wt % of an ethylene or a styrene monomer,
      (b) 0.1 to 50 wt % of an unsaturated anhydride-, epoxide- or carboxylic acid-containing monomer,
      (c) 0 to 50 wt % (meth)acrylic ester monomer; and
   from 0.1 to 20 wt % of an ionomer, based on the total weight of the layer A.

The polyolefin is preferably polyethylene or polypropylene, more preferably polyethylene.

The polyester is an aliphatic polyester. The majority of aliphatic polyesters (e.g. polyhydroxyalkanoate (PHA), poly (lactic acid) (PLA), polycaprolactone (PCL), copolyesters, polyesteramides, etc being obtainable from renewal resources and/or being biodegradable constitutes an additional advantage when added in combination with polyolefins, currently used alone. Preferably the aliphatic polyester is a poly(lactic acid).

In particular embodiments, the ionomer is
   a copolymer comprising one or more olefin or styrene monomers, and one or more monomers comprising a functional group selected from the group comprising carboxylate, sulfonate, and a carboxylic acid anhydride; or
   a grafted polyolefin or polystyrene comprising one or more functional groups selected from the group comprising carboxylate, sulfonate, a carboxylic acid anhydride, phosphonate, and phosphinate;
   or combination thereof.

In certain embodiments, the ionomer is a copolymer comprising:
   from about 50 w % to about 99.8 w % of one or more monomers selected from the group comprising ethylene, propylene, 1-butene, 1-pentene, 4-methyl-1-pentene, 1-hexene, 2-methylpropene, styrene, 2-methylstyrene, 3-methylstyrene, 4-methylstyrene, alpha-methylstyrene, cis and/or trans beta-methylstryrene, halogenated styrene isomers, vinyl chloride, vinylidene chloride, butadiene, acrylonitrile, methacrylonitrile, cyclopentene, and cyclohexene; copolymerized with from about 0.2 wt % to about 30 wt % of one or more monomers selected from the group comprising methacrylic acid, acrylic acid, maleic acid or a monoester thereof, maleic anhydride, ethacrylic acid, fumaric acid or a monoester thereof, crotonic acid, itaconic acid or a monoester thereof, itaconic anhydride, vinyl sulfonic acid, 2-methacryloyloxy-ethanesulfonate, styrenesulfonic acid, 2-acrylamido-2-methylpropane sulfonic acid (AMPS), vinylphosphonic acid, 2-(methacryloyloxy) ethylphosphate, mesaconic acid, citraconic acid or a monoester thereof, glutaconic acid or a monoester thereof, methylmaleic acid or a monoester thereof, methylmaleic anhydride, citraconic anhydride, glutaconic anhydride, endobicyclo-[2,2,1]-5-heptene-2,3-dicarboxylic acid or a monoester thereof, and endobicyclo-[2,2,1]-5-heptene-2,3-dicarboxylic acid anhydride.

In particular embodiments, the ionomer is a polymer selected from the group comprising polyethylene, polypropylene, a polyethylene/polypropylene copolymer, polybutene, polyhexene, polycyclopentene, polycyclohexene, and polystyrene, said polymer being grafted with one or more compounds selected from the group comprising maleic anhydride, acrylic acid or a salt thereof, and methacrylic acid or a salt thereof.

Layer A further comprises from 0.1 to 20 wt % of a co- or ter-polymer comprising:
a) 50 to 99.9 wt % of ethylene or styrene monomer;
b) 0.1 to 50 wt % of an unsaturated epoxide, anhydride-, or carboxylic acid-containing monomer; and
c) 0 to 50 wt % of a (meth)acrylic ester monomer.

The unsaturated anhydride-, epoxide-, or carboxylic acid-containing monomer is preferably selected from maleic anhydride, or glycidyl methacrylate. Preferably, it is present in an amount ranging from 0.2 to 30 wt % of the co- or ter-polymer.

The (meth)acrylic ester monomer is preferably selected from methyl, ethyl, n-butyl, iso-butyl, 2-ethylhexyl, or n-octyl (meth)acrylate. It is preferably present from 0.5 to 40 wt %, more preferably 1 to 30 wt %, of the terpolymer.

The article may comprise a further layer B1 comprising from 50 to 100 wt % of an aliphatic polyester selected from polyhydroxyalkanoate, poly(lactic acid), polycaprolactone, copolyesters and polyesteramides, preferably from 60 wt % to 100 wt %, more preferably from 70 wt % to 100 wt %. Said layer B1 is preferably adjacent to layer A. Preferably the aliphatic polyester is a poly(lactic acid).

In a particular embodiment, the article may comprise layers A and B1, wherein: layer A is the outer layer, and layer B1 is the inner layer.

The rotomoulded article may comprise a further layer B comprising from 50 to 100 wt % of a polyolefin, preferably adjacent to layer A. The polyolefin of said layer B is preferably a polyethylene. The polyolefin can be different from the polyolefin of layer A. The polyolefin, being preferentially polyethylene, of said layer B is preferably foamed.

In a particular embodiment, the article may comprise layers A, B and B1, wherein layer A is the outer layer, layer B is the intermediate layer adjacent to layer A and layer B1, and layer B1 is the inner layer.

The article may comprise yet a further layer C comprising from 50 to 100 wt % of a polyolefin, which is preferably adjacent to layer B. The polyolefin can be different from the polyolefin of layer A. The polyolefin of said layer C is preferably a polyethylene.

In a particular embodiment, the article may comprise, or consist of the three layers A, B and C, wherein:
layer A is the outer layer,
layer B is the intermediate layer adjacent to layer A and layer C, preferably comprising a foamed polyethylene from 50 to 100 wt %,
layer C is the inner layer, preferably comprising polyethylene from 50 to 100 wt %.

In this case, layer C can be identical to layer A.

In particular embodiments, the article comprises at least one cavity which is provided with a polyurethane (PU); preferably a polyurethane foam.

The present invention also encompasses a polyurethane filled rotomoulded article comprising one or more layers wherein a layer A comprises:
from 50 to 99.4 wt % of a polyolefin;
from 0.5 to 50 wt % of a polyester, wherein said polyester is an aliphatic polyester selected from poly(lactic acid), polyhydroxyalkanoate, polycaprolactone, copolyesters and polyesteramides;
from 0.1 to 20 wt % of a co- or ter-polymer, comprising:
(a) 50 to 99.9 wt % of an ethylene or a styrene monomer,
(b) 0.1 to 50 wt % of an unsaturated anhydride-, epoxide- or carboxylic acid-containing monomer,
(c) 0 to 50 wt % (meth)acrylic ester monomer; and
from 0.1 to 20 wt % of an ionomer.

Such an article can be a can, a tank, car part, preferably a car door or car body.

1 Layer A

The rotomoulded article of the invention comprises one or more layers wherein a layer A comprises:
from 50 to 99.4 wt % of a polyolefin;
from 0.5 to 50 wt % of a polyester, wherein said polyester is an aliphatic polyester selected from poly(lactic acid), polyhydroxyalkanoate, polycaprolactone, copolyesters and polyesteramides; more preferably wherein said polyester is an aliphatic polyester selected from poly (lactic acid), polyhydroxyalkanoate, polycaprolactone, and polyesteramides; more preferably wherein said polyester is an aliphatic polyester selected from poly (lactic acid), polycaprolactone, and polyesteramides;
from 0.1 to 20 wt % of a co- or ter-polymer, comprising:
(a) 50 to 99.9 wt % of an ethylene or a styrene monomer,
(b) 0.1 to 50 wt % of an unsaturated anhydride-, epoxide- or carboxylic acid-containing monomer,
(c) 0 to 50 wt % (meth)acrylic ester monomer; and
from 0.1 to 20 wt % of an ionomer, preferably from 0.1 to 10 wt %, more preferably from 0.5 to 8 wt %, based on the total weight of the layer A.

1.1. The Polyolefin (e.g. Polyethylene)

The polyolefin is preferably present in an amount ranging from at least 50 wt % based on the total weight of layer A, for example at least 60 wt %, for example at least 65 wt %, for example at least 70 wt %, for example at least 75 wt %, for example at least 80 wt % for example at least 90 wt %, for example at least 95 wt %, for example at least 96 wt %, for example at least 97 wt %, for example at least 98 wt %, for example at least 99 wt %, up to 99.4 wt % of layer A. In some embodiments, the polyolefin can be present in amounts ranging preferably from at least 70 to 95 wt % of layer A, more preferably 75 to 90 wt %.

The polyolefin can be selected from polyethylene, polypropylene, polybutene or polyhexene.

Preferably, the polyolefin is polyethylene. With polyethylene herein it is meant a polyethylene comprising at least 50 wt % of ethylene monomers. The polyethylene may comprise up to 50 wt % of alpha-olefin comonomers selected from alpha-olefins having from 3 to 12 carbon atoms. Preferably, the comonomer is selected from propylene, n-butene, iso-butene, n-pentene, iso-pentene, n-butene or iso-butene. In certain embodiments, the polyethylene comprises at least 60, 70, 80, 90, or 100 wt % of ethylene monomers.

The polyethylene can be prepared with a chromium, a Ziegler-Natta catalyst or a single-site catalyst, such as a metallocene, according to any known polymerization process in the art.

Preferably, the polyethylene is prepared with a single-site catalyst, in particular with a metallocene catalyst. This induces a narrow molecular weight distribution, regular comonomer insertion, and uniform comonomer distribution. This means such a polyethylene preferably has a narrow molecular weight distribution of from 1 to 5 (measured by GPC) and a narrow comonomer distribution index (CDBI) i.e. at least 50%, preferably at least 60%, more preferably at least 75%, measured by TREF (temperature rising elusion fractionation). Any metallocene known in the art can be used to prepare the polyethylene. In one embodiment, the metallocene can be an unbridged metallocene, for example, selected from the group comprising bis(iso-butylcyclopentadienyl) zirconium dichloride, bis(pentamethylcyclopentadienyl) zirconium dichloride, bis(tetrahydroindenyl) zirconium dichloride, bis(indenyl) zirconium dichloride, bis(1,3-dimethylcyclopentadienyl) zirconium dichloride, bis (methylcyclopentadienyl) zirconium dichloride, bis(n-butylcyclopentadienyl) zirconium dichloride, and bis (cyclopentadienyl) zirconium dichloride; and preferably selected from the group comprising bis(cyclopentadienyl) zirconium dichloride, bis(tetrahydroindenyl) zirconium dichloride, bis(indenyl) zirconium dichloride, and bis(1-methyl-3-butyl-cyclopentadienyl)zirconium dichloride. In another embodiment, the metallocene can be a bridged metallocene, for example, selected from the group comprising ethylene bis(4,5,6,7-tetrahydro-1-indenyl) zirconium dichloride, ethylene bis(1-indenyl) zirconium dichloride, dimethylsilylene bis(2-methyl-4-phenyl-inden-1-yl) zirconium dichloride, dimethylsilylene bis(2-methyl-1H-cyclopenta[a]naphthalen-3-yl) zirconium dichloride, cyclohexyl-methylsilylene bis[4-(4-tert-butylphenyl)-2-methyl-inden-1-yl] zirconium dichloride, dimethylsilylene bis[4-(4-tert-butylphenyl)-2-(cyclohexylmethyl)inden-1-yl] zirconium dichloride. Bridged bis(tetrahydroindenyl) metallocenes are preferred, in particular ethylene bis(4,5,6,7-tetrahydro-1-indenyl) zirconium dichloride.

The polyethylene preferably has a density of at least 0.900 g/cm$^3$, more preferably at least 0.910 g/cm$^3$, even more preferably of at least 0.920 g/cm$^3$ and most preferably of at least 0.930 g/cm$^3$. It is of at most 0.965 g/cm$^3$, preferably of at most 0.960 g/cm$^3$. Most preferably, the polyethylene has a density of 0.932 to 0.945 g/cm$^3$. The density is measured following the method of standard test ISO 1183 at 23° C.

The polyethylene preferably has a melt index $MI_2$ of at least 1 dg/min, preferably of at least 1.5 dg/min, more preferably of at least 2 dg/min. It is preferably at most 25 dg/min, more preferably at most 20 dg/min. Most preferably, the polyethylene has an $MI_2$ of 1 dg/min to 10 dg/min. The melt flow index $MI_2$ is measured following the method of standard test ISO 1133 condition D at a temperature of 190° C. and a load of 2.16 kg.

Most preferably the polyethylene is prepared with an ethylene bis(4,5,6,7-tetrahydro-1-indenyl) zirconium dichloride metallocene, wherein the polyethylene has a density of 0.930 to 0.950 g/cm$^3$ and a melt index $MI_2$ of 1 to 10 dg/min.

The polyolefin of layer A may contain additives, in particular additives suitable for rotational moulding, such as, by way of example, processing aids, mould-release agents, anti-slip agents, primary and secondary antioxidants, light stabilizers, anti-UV agents, acid scavengers, flame retardants, fillers, nanocomposites, lubricants, antistatic additives, nucleating/clarifying agents, antibacterial agents, plastisizers, colorants/pigments/dyes and mixtures thereof. Preferably the polyolefin comprises an anti-UV agent. Illustrative pigments or colorants include titanium dioxide, carbon black, cobalt aluminum oxides such as cobalt blue, and chromium oxides such as chromium oxide green. Pigments such as ultramarine blue, phthalocyanine blue and iron oxide red are also suitable. Specific examples of additives include lubricants and mould-release agents such as calcium stearate, zinc stearate, SHT, antioxidants such as Irgafos 168™, Irganox 1010™, and Irganox 1076™, anti-slip agents such as erucamide, light stabilizers such as Cyasorb THT 4611 and 4802, tinuvin 622™ and tinuvin 326™, and nucleating agents such as Milliken HPN20E™, or Milliken Hyperform® HPR-803i.

An overview of the additives that can be used in the injection-moulded articles of the present invention may be found in Plastics Additives Handbook, ed. H. Zweifel, 5th edition, 2001, Hanser Publishers.

In a preferred embodiment of layer A, the polyester, polyolefin, co- or ter-polymer, and ionomer are compounded together according to any known compounding method in the art, e.g. mixer, like a Banbury mixer, or an extruder, like a twin screw extruder. The extrusion is preferably carried out at a temperature below 230° C.

1.2. Polyester (e.g. PLA)

As described hereinabove, at least one layer A of the rotomoulded article comprises from 0.5 to 50 wt % of a polyester.

Preferably, the polyester is an aliphatic polyester, although any polyester known in the art can be used. The advantage of using an aliphatic polyester is that it is prepared from natural renewable resources. The aliphatic polyester is preferably selected from polyhydroxyalkanoate (PHA), poly (lactic acid) (PLA), polycaprolactone (PCL), copolyesters and polyesteramides.

The polyester is preferably present in an amount ranging from 1 to 30 wt % based on the total weight of layer A, more preferably from 2 to 25 wt %, even more preferably from 3 to 20 wt %, yet even more preferably from 4 to 15 wt %, and most preferably from 7 to 12 wt % of layer A.

A non-limiting example of a suitable copolyester include Tritan™ copolyester from Eastman: a copolyester based on the use of 2,2,4,4-tetramethyl-1,3-cyclobutanediol (TMCD) as a comonomer.

Most preferably, the polyester is a poly(lactic acid) (PLA). In particular embodiments, layer A comprises from 5 to 30 wt % PLA, more preferably from 5 to 25 wt % PLA. Articles wherein the outer layer comprises between 5 and 30 wt % PLA are particularly easy to demould, and show very little deformation, while providing excellent thermal and mechanical properties.

Preferably, the poly(lactic acid) (also known as polylactide) is a thermoplastic resin derived from renewable resources.

In an embodiment, the poly(lactic acid) also includes copolymers of lactic acid. For instance, copolymers of lactic acid and trimethylene carbonate according to EP application number 11167138 and copolymers of lactic acid and urethanes according to WO 2008/037772 and PCT application number PCT/EP2011/057988. The introduction of comonomers to PLA increases the ductility (i.e. decreases the brittleness) of the PLA. Preferably the poly(lactic acid) is a homopolymer.

Preferably, the PLA used in the rotomoulded article of the invention can be a poly-L-lactide (PLLA), a poly-D-lactide (PDLA) and/or a mixture of PLLA and PDLA. By PLLA, it is meant a polymer in which the majority of the repetitive units are monomers of L-lactide and by PDLA, a polymer in which the majority of the repetitive units are D-lactide monomers. Stereocomplexes of PLLA and PDLA, as described for example in WO 2010/097463, can also be used. Preferably, the polylactide used is the PLLA.

Preferably, the PLLA or the PDLA respectively have an optical purity (called isomeric purity) of the L or D isomer, which is higher than 92 wt % of the PLA, preferably higher than 95 wt %. An optical purity from at least 99 wt % is more preferred.

The PLLA used in the invention thus includes a content of D isomer lower than 8 wt %, preferably lower than 5 wt %, more preferably lower or equal to 1 wt % of the PLLA. By analogy, the PDLA includes a content of L isomer lower than 8 wt %, preferably lower than 5 wt %, more preferably lower or equal to 1 wt % of the PDLA.

PLA (PLLA or PDLA) preferably has a weight average molecular weight (Mw) ranging between 30.000 and 500.000 g/mol, more preferably between 50.000 and 400.000 g/mol, even more preferably between 50.000 and 300.000 g/mol. The weight average molecular weight is measured by chromatography by gel permeation compared to a standard polystyrene in chloroform at 30° C. The ratio of the weight average molecular weight (Mw) to the Mn is generally between 1.0 and 5.0.

The process for preparing PLA is well-known by the person skilled in the art. For example it can be obtained by the process describes in documents WO1998/002480, WO 2010/081887, FR2843390, U.S. Pat. No. 5,053,522, U.S. Pat. No. 5,053,485 or U.S. Pat. No. 5,117,008.

In an embodiment, the PLA is obtained by polymerizing lactide, in the presence of a suitable catalyst and preferably in the presence of a compound of formula (I), acting as a co-initiator and transfer agent of the polymerization, $$R^1\text{—OH} \qquad (I)$$

wherein $R^1$ is selected from the group comprising $C_{1-20}$alkyl, $C_{6-30}$aryl, and $C_{6-30}$aryl$C_{1-20}$alkyl, each group being optionally substituted by one or more substituents selected from the group comprising halogen, hydroxyl, and $C_{1-6}$alkyl. Preferably, $R^1$ is a group selected from $C_{3-12}$alkyl, $C_{6-10}$aryl, and $C_{6-10}$aryl$C_{3-12}$alkyl, each group being optionally substituted by one or more substituents each independently selected from the group comprising halogen, hydroxyl, and $C_{1-6}$alkyl; preferably, $R^1$ is a group selected from $C_{3-12}$alkyl, $C_{6-10}$aryl, and $C_{6-10}$aryl$C_{3-12}$alkyl, each group being optionally substituted by one or more substituents each independently selected from the group comprising halogen, hydroxyl and $C_{1-4}$alkyl. The alcohol can be a polyol such as diol, triol or higher functionality polyhydric alcohol. The alcohol may be derived from biomass such as for instance glycerol or propanediol or any other sugar-based alcohol such as for example erythritol. The alcohol can be used alone or in combination with another alcohol.

In an embodiment, non-limiting examples of initiators include 1-octanol, isopropanol, propanediol, trimethylolpropane, 2-butanol, 3-buten-2-ol, 1,3-butanediol, 1,4-butanediol, 1,6-hexanediol, 1,7-heptanediol, benzyl alcohol, 4-bromophenol, 1,4-benzenedimethanol, and (4-trifluoromethyl) benzyl alcohol; preferably, said compound of formula (I) is selected from 1-octanol, isopropanol, and 1,4-butanediol.

The PLA structure can be of the following types in terms of chain termination:

R—OH and R—COOH, with R being the PLA chain, obtainable when using monoalcohol as co-initiator, HO—R—OH and HOOC—R—COOH obtainable when using diol as co-initiator, or multiple OH (e.g. 5), obtainable when using triol or higher functionality polyhydric alcohol as co-initiator, Preferably, the PLA used in layer A has R—OH and R—COOH, chain termination, and was obtained using a monoalcohol as co-initiator.

Preferably, the PLA used in the layer A of the invention has a crystallinity index (CI), as measured by XRD, of at least 5%. Preferably the crystallinity index of the PLA is at most 60%.

Preferably, the PLA can be in the form of particles with an average particle size between 20 μm and 2000 μm. However between 50 and 1000 μm is preferred and even more preferred is the average particle size of between 100 and 800 μm. In the present invention, by particles one understands "grains", which can be spherical, and/or ovoid forms, or any other shapes or forms. The size corresponds to the longest dimension of these particles. In the case of spherical particles, the size corresponds to the diameter of these particles. The particles of PLA can be obtained by extrusion of the PLA exiting the polymerization reactor through a die with die gaps having corresponding dimensions.

The PLA defined in the present invention can be in the form of micropellets or powders. The particles of PLA can be also obtained by grinding/milling pellets of PLA whose dimension is higher than 2000 μm, for example pellets whose dimension lies between 4000 μm and 5000 μm. Such pellets of PLA can be obtained after polymerization per extrusion while passing the PLA through a die whose openings have corresponding dimension. In this case, the grinding of PLA pellets can be carried out by various types of grinders, such as for example a grinder with a disc, a mill, or an electromagnetic grinder, for example with a piston. Grinding can be done at room temperature or cryogenically, i.e. carried out at a temperature ranging between −10 and −200° C., preferentially between −20 and −100° C. Cryogenic grinding allows in particular to avoid yellowing of the articles obtained and to obtain a highly grinded powder flow. Cryogenic grinding also makes it possible to produce a powder without filaments, this being particularly adapted to the rotomoulding application. Grinding can be carried out under inert atmosphere, i.e. in the absence of oxygen; for example under nitrogen.

After grinding, it is possible to measure and/or modify the granulometry of the PLA by using rotating sieves. To determine the granulometry of the PLA one can use a method of sieving, for example, by using sieves of different mesh sizes, or with a laser i.e. a Malvern Mastersizer.

In the present invention, one defines the PLA whose average particle size lies between 20 μm and 2000 μm which was obtained from grinding PLA pellets with initial dimensions greater than 2000 μm "PLA powder". The PLA can be either in the form of powder, or in the form of micropellets, or in the form of a mixture of powder and micropellets. The powder or micropellets of PLA can be used as they are without the addition of other compounds or they can be mixed with various compounds, loads, agents and/or additives.

Many methods of mixing PLA with such additives can be used: mixing the additives with PLA in the melt or adding the additives directly to the mould with the PLA powder or micropellets. They can also be mixed with the powder after grinding or with the micropellets before introduction into the rotational mould. They can also be introduced into the PLA still in the molten state obtained directly after polymerization. Some of these additives can even be added during the polymerization of the PLA. One can also consider the addition of these additives to PLA pellets having a dimension higher than 2.000 μm before grinding. The powder and micropellets of PLA can thus include antioxidants, and light and heat stabilizers, as well as anti-UV agents such as 2-(2-Hydroxy-5-tert-octylphenyl) benzotriazole commercially available under the name CYASORB® UV-5411 Light Absorber from Cytec.

For example, suitable antioxidants include compounds containing phenol functional groups.

One can use antioxidants called "primaries" such as compounds 1,3,5-TRIS(4-tert-butyl-3-hydroxy-2,6-dimethylbenzyl)-1,3,5-triazine-2,4,6-(1H,3H,5H)-trione, commercially available under the name Cyanox® 1790 from Cytec.

One can also use antioxidants called "secondaries" such as compounds containing phosphite functional groups such as Ultranox® 626 from Chemtura or Irgafos® 168 from BASF.

When one of these additives is present, its concentration in the PLA preferably lies between 0.05 wt % and 5 wt %.

Fillers, impact resistance modifiers and other additives can also be included.

Fillers are preferentially selected from the group of fibrous compositions such as glass fibres, metal fibres, carbon fibres, minerals such as clays, kaolin, or nanoparticle such as carbon nanotubes, and powders such as talc.

Other additives which can be used include, for example, fire retardants, lubricants, plasticizers, anti-static agents, pigments, dyes, surfactants. Among plasticizers, one can in particular select those of the family of citrates, in particular citrate esters like citrate of terbutylene (TBC) or butyrate esters like tri-ethylene glycol di 2-ethyl hexylbutyrate or their mixtures. Preferably, TBC is used.

The polyester, in particular PLA, can then be blended either in dry form or in the melt with the polyolefin and the ionomer, to create the composition required for layer A.

However, in a preferred embodiment of layer A, the PLA pellets, polyolefin, co- or ter-polymer, and ionomer are compounded together according to any known compounding method in the art, e.g. mixer, like a Banbury mixer, or an extruder, preferably a twin screw extruder. The extrusion is generally carried out at a temperature below 230° C.

1.3. Ionomer

Layer A of the rotomoulded article described herein comprises one or more ionomers, more particularly in a concentration ranging from 0.1 to 20 wt %. The present inventors surprisingly found that the presence of about 0.1 to 20 wt % of an ionomer significantly improves the dispersion of polyester (such as PLA) in the composition of layer A, thus increasing the homogeneity of the composition. Moreover, it was found that the ionomer may significantly increase the mechanical properties of the composition, such as impact properties.

Suitable ionomers include polyelectrolyte that comprises copolymers containing both electrically neutral repeating units and a fraction of ionized or ionizable units, usually representing at most 15 wt % of the copolymer. They link in such a way that, even though they are stiff at room temperature, the bonds may be broken down thermally and the new linkages will cause the material to act as though it were a thermoplastic material.

Layer A comprises from 0.1 to 20 wt % of an ionomer based on the total weight of layer A. The optimal amount of ionomer may depend on the type of polyolefin, polyester, and ionomer used for layer A. In particular embodiments, layer A comprises from 0.2 to 10 wt % of ionomer(s), more particularly from 0.5 to 7 wt %.

In particular embodiments, the ionomer is:
  a copolymer comprising one or more olefin monomers (such as ethylene, propylene, 1-butene, etc.) or styrene monomers (such as styrene, 2-methylstyrene, 3-methylstyrene, etc.), and one or more monomers comprising a functional group selected from the group comprising carboxylate, sulfonate, and a carboxylic acid anhydride; or
  a grafted polyolefin or polystyrene comprising one or more functional groups selected from the group comprising carboxylate, sulfonate, a carboxylic acid anhydride, phosphonate, and phosphinate; preferably carboxylate, sulfonate, or a carboxylic acid anhydride, most preferably carboxylate.

In particular embodiments, the ionomer is a copolymer comprising one or more olefin monomers; and one or more monomers comprising a functional group as described hereinabove. In further embodiments, the ionomer comprises from about 50 w % to about 99.8 w % of olefin monomer(s); and from about 0.2 wt % to about 30 wt % of monomer(s) comprising a functional group. In yet further embodiments, the ionomer comprises from about 70 w % to about 98 w % of olefin monomer(s); and from about 2 wt % to about 20 wt % of monomer(s) comprising a functional group.

Suitable ionomers include copolymers, particularly random copolymers, comprising:
  from about 50 w % to about 99.8 w %, preferably from 70 to 98 wt %, of one or more monomers, preferably one or two monomers, selected from the group comprising ethylene, propylene, 1-butene, 1-pentene, 4-methyl-1-pentene, 1-hexene, 2-methylpropene, styrene, 2-methylstyrene, 3-methylstyrene, 4-methylstyrene, alpha-methylstyrene, cis and/or trans beta-methylstryrene, halogenated styrene isomers, vinyl chloride, vinylidene chloride, butadiene, acrylonitrile, methacrylonitrile, cyclopentene, and cyclohexene; copolymerized with
  from about 0.2 wt % to about 30 wt %, preferably from 2 to 20 wt % of one or more monomers, preferably one or two monomers, selected from the group comprising methacrylic acid, acrylic acid, maleic acid or a monoester thereof (such as monomethyl maleate), maleic anhydride, ethacrylic acid, fumaric acid or a monoester thereof (such as monomethyl fumarate), crotonic acid, itaconic acid or a monoester thereof (such as monomethyl itaconate), itaconic anhydride, vinyl sulfonic acid, 2-methacryloyloxy-ethanesulfonate, styrenesulfonic acid, 2-acrylamido-2-methylpropane sulfonic acid (AMPS), vinylphosphonic acid, 2-(methacryloyloxy)ethylphosphate, mesaconic acid, citraconic acid or a monoester thereof (such as monomethyl citraconic acid), glutaconic acid or a monoester thereof (such as monomethyl glutaconate), methylmaleic acid or a monoester thereof (such as monomethyl methylmaleate), methylmaleic anhydride, citraconic anhydride, glutaconic anhydride, endobicyclo-[2,2,1]-5-heptene-2,3-dicarboxylic acid or a monoester thereof (such as monomethyl ester of heptene-2,3-dicarboxylic acid), and endobicyclo-[2,2,1]-5-heptene-2,3-dicarboxylic acid anhydride.

For example, ionomers suitable for use in the present invention include, ethylene-acrylic acid copolymers, ethylene-methacrylic acid copolymers, ethylene-itaconic acid copolymers, ethylene-maleic acid copolymers, ethylene-acrylic acid-methyl methacrylate copolymers, ethylene-methacrylic acid-vinyl acetate copolymers, ethylene-acrylic acid-vinyl alcohol copolymers, ethylene-propylene-acrylic acid copolymers, ethylene-styrene-acrylic acid copolymers, ethylene-methacrylic acid-acrylonitrile copolymers, ethylene-vinyl chloride-acrylic acid copolymers, ethylene-chlorotrifluoroethylene-methacrylic acid copolymers, etc.

In some embodiments, the ionomer is a (random) copolymer comprising:
  from about 50 w % to about 99.8 w %, preferably from 70 to 99 wt %, of one or two monomers selected from the group comprising ethylene and propylene; copolymerized with
  from about 1 wt % to about 20 wt %, preferably from 1 to 15 wt % of one or more monomers selected from the group comprising methacrylic acid, acrylic acid, maleic acid or a monoester thereof, and maleic anhydride.

In some embodiments, preferred ionomers include poly (ethylene-co-methacrylic acid) (random) copolymers. These copolymers provide particularly good mechanical properties to the composition. Poly(ethylene-co-methacrylic acid) (random) copolymers are derived from ethylene and methacrylic acid monomers. Typically, such ionomers comprise from 0.1 to 20 wt %, more particularly from 0.1 to 15 wt %, methacrylic acid monomers. In certain embodiments, the ionomer comprises a sodium or zinc salt of poly(ethylene-co-methacrylic acid).

In certain embodiments, the ionomer is a grafted polyolefin or polystyrene comprising one or more functional groups selected from the group comprising carboxylate, sulfonate, a carboxylic acid anhydride, phosphonate, and phosphinate; preferably a carboxylate, sulfonate, or a carboxylic acid anhydride. In certain embodiments, the functional group comprises from about 0.1 to 15% of the molecular weight of the ionomer. In further embodiments, the ionomer is a polymer selected from the group comprising polyethylene, polypropylene, a polyethylene/polypropylene copolymer, polystyrene, said polymer being grafted with one or more compounds selected from the group comprising maleic anhydride, acrylic acid or a salt thereof, and methacrylic acid or a salt thereof.

Examples of suitable ionomers suitable for the present invention include polyethylene-acrylic acid graft copolymers, polypropylene-acrylic acid graft copolymers, etc.

In certain embodiments, the ionomer is a (random) zinc-sulphonated ethylene/propylene/5-ethylidene-2-norbornene terpolymer. Example of such ionomers are ionomers available under the tradename Thionic®.

Suitable ionomers can be prepared by methods well known in the art such as, for example, as described in U.S. Pat. Nos. 3,264,272, 3,404,134, and 3,355,319, each of which is hereby incorporated by reference.

Suitable commercially available ionomers include, but are not limited to, those known under the tradenames of Surlyn® (DuPont), EEA Copolymer (ethylene-ethyl acrylate copolymer), Hycar® (Goodrich), Iotek® (ExxonMobil), Priex® (Solvay Engineered Polymers), AClyn® (Honeywell International), Nafion® (DuPont), and Thionic® (Uniroyal).

The ionized or ionizable moieties of the ionomers may appear in proton or salt form. Typically, 5 to 100% of the ionized moieties of the ionomer, such as carboxylate, sulfonate, phosphonate, or phosphinate moieties, are neutralized with a suitable cation, such as $Na^+$, $Zn^{2+}$, $NH_3^+$, $Li^+$, $K^+$, $Ca^{2+}$, $Mg^{2+}$, or combinations thereof. Preferred cations are $Na^+$ and $Zn^{2+}$.

In addition to the copolymer components, the ionomer may be further be copolymerized with any other unsaturated monomer than the olefin and ionized monomers described above. The additional monomer content of the copolymer is preferably at most 20 w %. Examples of additional unsaturated monomer include vinyl esters such as vinyl acetate or vinyl propionate; and (meth)acrylic acid esters such as methyl (meth)acrylate, ethyl (meth)acrylate, isopropyl (meth)acrylate, n-butyl (meth)acrylate, isobutyl (meth)acrylate, or 2-ethylhexyl (meth)acrylate. (Meth)acrylic acid as referred to herein means acrylic acid or methacrylic acid.

1.4. Co- or Ter-Polymer (Compatibilising Agent)

Layer A of the rotomoulded article described herein further comprises from 0.1 to 20 wt % of a co- or ter-polymer, preferably from 0.1 to 20 wt % of a co- or ter-polymer. The optional co- or ter-polymer comprises ethylene or styrene monomer, an unsaturated anhydride-, epoxide-, or carboxylic acid-containing monomer and optionally a (meth)acrylic ester monomer. When present, the co- or ter-polymer acts as a compatibilizer between the polar polyester and the polyolefin. If present the co- or ter-polymer is preferably present from 0.1 to 20 wt %, more preferably from 0.1 to 15 wt %, even more preferably from 0.5 to 10 wt %, most preferably from 1 to 5 wt % of layer A, for example about 2%.

Preferably, the co- or ter-polymer comprises:
  a) 50 to 99.9 wt % of ethylene or styrene monomer, preferably 50 to 99.8 wt %,
  b) 0.1 to 50 wt % of an unsaturated anhydride-, epoxide- or carboxylic acid-containing monomer,
  c) 0 to 50 wt % of a (meth)acrylic ester monomer,
the total sum of components being 100 wt %.

In the embodiment of the co-polymer, it comprises preferably:
  a) 50 to 99.9 wt % of ethylene or styrene monomer, preferably 50 to 99 wt %,
  b) 0.1 to 50 wt % of an unsaturated anhydride-, epoxide-, or carboxylic acid-containing monomer, preferably 1 to 50 wt %,
the total sum of components being 100 wt %.

In the embodiment of the ter-polymer, it comprises preferably:
  a) 50 to 99.8 wt % of ethylene or styrene monomer,
  b) 0.1 to 50 wt % of an unsaturated anhydride-, epoxide-, or carboxylic acid-containing monomer,
  c) 0.1 to 50 wt % of a (meth)acrylic ester monomer,
the total sum of components being 100 wt %.

In all embodiments of the co- or ter-polymer, the ethylene or styrene monomer (a) is present from 50 to 99.9 wt %, preferably from 50 to 99.8 wt %, more preferably from 60 to 99.5 wt %, even more preferably from 65 to 99 wt %, most preferably from 70 to 98 wt %. In the embodiment of the copolymer, the ethylene or styrene monomer can be present from 90 to 98 wt %.

In all embodiments of the co- or ter-polymer, the unsaturated monomer (b) is preferably selected from an unsaturated anhydride- or epoxide-containing monomer. More preferably, the unsaturated monomer (b) is selected from a glycidyl (meth)acrylate or maleic anhydride, most preferably glycidyl (meth)acrylate. The unsaturated monomer (b) is preferably present from 0.1 to 40 wt %, more preferably from 0.2 to 30 wt %, even more preferably from 0.3 to 20 wt %, yet even more preferably from 0.3 to 15 wt % and most preferably from 0.3 to 10 wt % of the co- or terpolymer.

The (meth)acrylic ester monomer (c), if present, is preferably selected from those acrylates which have between 1 and 10 carbon atoms such as for example methyl (meth)acrylate, ethyl (meth)acrylate, n-butyl (meth)acrylate, isobutyl (meth)acrylate, 2-ethylhexyl (meth)acrylate, or n-octyl (meth)acrylate. If present, it preferably makes up 0.1 to 50 wt % of the terpolymer, preferably 0.5 to 40 wt %, more preferably 1 to 30 wt %, even more preferably 2 to 25 wt % and most preferably 5 to 25 wt % of the terpolymer.

The copolymers of ethylene or styrene monomer and of a glycidyl (meth)acrylate or maleic anhydride can contain from 50 to 99 wt % of ethylene or styrene monomer and from 1 to 50 wt % of a glycidyl (meth)acrylate or maleic anhydride, preferably from 90 to 98 wt % of ethylene or styrene monomer and from 2 to 10 wt % of a glycidyl (meth)acrylate or maleic anhydride, the total sum of components being 100 wt %.

The terpolymers of ethylene or styrene monomer, of a glycidyl (meth)acrylate or maleic anhydride and of a (meth) acrylic ester monomer can contain from 50 to 98.8 wt % of ethylene or styrene monomer, from 0.2 to 10 wt % of a glycidyl (meth)acrylate or maleic anhydride and from 1 to 50 wt % of a (meth)acrylic ester monomer, the total sum of components being 100% of the terpolymer. Preferably the terpolymer can contain from 55 to 97.7 wt % of ethylene or styrene monomer, from 0.3 to 8% of a glycidyl (meth)acrylate or maleic anhydride, and from 2 to 35% of (meth) acrylic ester monomer, the total sum of components being 100% of the terpolymer.

Still more preferably, the co- or ter-polymer is selected among copolymers of ethylene and glycidyl methacrylate and terpolymers of ethylene or styrene, acrylic ester monomers and glycidyl methacrylate or maleic anhydride. Among those one can use for example the copolymer of ethylene and glycidyl methacrylate sold under the trademark Lotader®AX 8840 by Arkema France, the terpolymer of ethylene, ethylacrylate and maleic anhydride sold under the denomination Lotader®4700 by Arkema France, as well as the terpolymer of styrene monomer, acrylic esters and glycidyl methacrylate sold under the trademark Joncryl® by BASF.

In the most preferred embodiment, the co- or ter-polymer is selected from a terpolymer of ethylene or styrene monomer, acrylic esters and glycidyl methacrylate. Preferably, the acrylic ester is methylacrylate. An example of such a terpolymer is Lotader®AX8900 sold by Arkema France comprising 68 wt % of ethylene monomer, 8 wt % of glycidylmethacrylate and 24 wt % methyl acrylate.

The co- or terpolymer, can then be blended either in dry form or in the melt with the polyolefin, in particular a polyethylene, and the polyester, in particular PLA, and ionomer to create the composition required for layer A.

The co- or ter-polymer, the ionomer and the polyester can be added one by one to the polyolefin and mixed after each addition or they can be added together and mixed together once.

In a preferred embodiment of layer A, the PLA pellets, polyolefin, ionomer and co- or ter-polymer are compounded together according to any known compounding method in the art, e.g. mixer, like a Banbury mixer, or an extruder, preferably a twin screw extruder. The extrusion is generally carried out at a temperature below 230° C.

The composition for layer A can be in powder or micropellet form suitable for rotational moulding.

2 Layer B1

In particular embodiments, the rotomoulded article comprises one or more layers including a layer A as described herein and at least one layer B1, wherein layer B1 comprises 50 to 100 wt % of a polyester, based on the total weight of layer B1, preferably wherein said polyester is an aliphatic polyester selected from polyhydroxyalkanoate, poly(lactic acid), polycaprolactone, copolyesters and polyesteramides. The polyester can be present in amounts ranging from 50 wt %, for example ranging from 60 wt %, for example ranging from 65 wt %, for example ranging from 70 wt %, for example ranging from 75 wt %, for example ranging from 80 wt %, for example ranging from 90 wt %, for example ranging from 95 wt %, for example ranging from 96 wt %, for example ranging from 97 wt %, for example ranging from 98 wt %, for example ranging from 99 wt %, for example ranging from 99.4 wt %, for example ranging from 99.5 wt % up to 100 wt % of layer B1. In particular, the polyester is preferably present from 70 to 95 wt % of layer B1, more preferably 75 to 90 wt %.

The polyester present in layer B1 can be the same as or different from the polyester present in layer A. The description of the polyester present in layer A applies mutatis mutandis to the polyester in layer B1, which can be the same as or different from any polyester present in layer A.

Most preferably, the polyester in layer B1 is a poly(lactic acid) (PLA).

The poly(lactic acid) also includes copolymers of lactic acid. For instance, copolymers of lactic acid and trimethylene carbonate according to EP application number 11167138 and copolymers of lactic acid and urethanes according to WO 2008/037772 and PCT application number PCT/EP2011/057988. The introduction of comonomers to PLA increases the ductility (i.e. decreases the brittleness) of the PLA.

Preferably, the PLA used in layer B1 can be a poly-L-lactide (PLLA), a poly-D-lactide (PDLA) and/or a mixture of PLLA and PDLA. By PLLA, it is meant a polymer in which the majority of the repetitive units are monomers of L-lactide and by PDLA, a polymer in which the majority of the repetitive units are D-lactide monomers. Stereocomplexes of PLLA and PDLA, as described for example in WO 2010/097463, can also be used. Preferably, the polylactide used is the PLLA.

Preferably, the PLLA or the PDLA respectively have an optical purity (called isomeric purity) of the L or D isomer, which is higher than 92 wt % of the PLA, preferably higher than 95 wt %. An optical purity from at least 99 wt % is more preferred.

The PLLA used in layer B1 thus includes a content of D isomer lower than 8 wt %, preferably lower than 5 wt %, more preferably lower or equal to 1 wt % of the PLLA. By analogy, the PDLA includes a content of L isomer lower than 8 wt %, preferably lower than 5 wt %, more preferably lower or equal to 1 wt % of the PDLA.

PLA (PLLA or PDLA) preferably has a weight average molecular weight (Mw) ranging between 30.000 and 500.000 g/mol, more preferably between 50.000 and 400.000 g/mol, even more preferably between 70.000 and 300.000 g/mol. The weight average molecular weight is measured by chromatography by gel permeation compared to a standard polystyrene in chloroform at 30° C. The ratio of the weight average molecular weight (Mw) to the Mn is generally between 1.0 and 5.0.

The process for preparing PLA is well-known by the person skilled in the art. For example it can be obtained by the process describes in documents WO1998/002480, WO 2010/081887, FR2843390, U.S. Pat. No. 5,053,522, U.S. Pat. No. 5,053,485 or U.S. Pat. No. 5,117,008.

In an embodiment, the PLA is obtained by polymerizing lactide, preferably in the presence of a compound of formula (I), acting as a co-initiator and transfer agent of the polymerization,

$$R^1—OH \quad (I)$$

wherein $R^1$ is selected from the group comprising $C_{1-20}$alkyl, $C_{6-30}$aryl, and $C_{6-30}$aryl$C_{1-20}$alkyl optionally substituted by one or more substituents selected from the group comprising halogen, hydroxyl, and $C_{1-6}$alkyl. Preferably, $R^1$ is selected from $C_{3-12}$alkyl, $C_{6-10}$aryl, and $C_{6-10}$aryl$C_{3-12}$alkyl, optionally substituted by one or more substituents, each independently selected from the group comprising halogen, hydroxyl, and $C_{1-6}$alkyl; preferably, $R^1$ is selected from $C_{3-12}$alkyl, $C_{6-10}$aryl, and $C_{6-10}$aryl$C_{3-12}$alkyl, optionally substituted by one or more substituents, each independently selected from the group comprising halogen, hydroxyl and $C_{1-4}$alkyl. The alcohol can be a polyol such as diol, triol or higher functionality polyhydric alcohol. The alcohol may be derived from biomass such as for instance glycerol or propanediol or any other sugar-based alcohol such as for example erythritol. The alcohol can be used alone or in combination with another alcohol.

In an embodiment, non-limiting examples of initiators include 1-octanol, isopropanol, propanediol, trimethylolpropane, 2-butanol, 3-buten-2-ol, 1,3-butanediol, 1,4-butanediol, 1,6-hexanediol, 1,7-heptanediol, benzyl alcohol, 4-bromophenol, 1,4-benzenedimethanol, and (4-trifluoromethyl) benzyl alcohol; preferably, said compound of formula (I) is selected from 1-octanol, isopropanol, and 1,4-butanediol.

The PLA structure can be of the following types in terms of chain termination:

R—OH and R—COOH, with R being the PLA chain, obtainable when using monoalcohol as co-initiator, HO—R—OH and HOOC—R—COOH obtainable when using diol as co-initiator, or multiple OH (e.g. 5), obtainable when using triol or higher functionality polyhydric alcohol as co-initiator, Preferably, the PLA used in layer B1 has R—OH and R—COOH, chain termination, and was obtained using a monoalcohol as co-initiator.

Preferably, the PLA used in the layer B1 of the invention has a crystallinity index (CI), as measured by XRD, of at least 5%. Preferably the crystallinity index of the PLA is at most 60%.

Preferably, the PLA used in layer B1 is in the form of particles with an average particle size between 20 µm and 2000 µm. However between 50 and 1000 µm is preferred and even more preferred is the average particle size of between 100 and 800 µm. In the present invention, by particles one understands "grains", which can be spherical and/or ovoid forms, or can be of any other shapes or forms. The size corresponds to the longest dimension of these particles. In the case of spherical particles, the size corresponds to the diameter of these particles. The particles of PLA can be obtained by extrusion of the PLA exiting the polymerization reactor through a die with die gaps having corresponding dimensions.

The PLA used in layer B1 can be in the form of micropellets or powders. The particles of PLA can be also obtained by grinding/milling pellets of PLA whose dimension is higher than 2000 µm, for example pellets whose dimension lies between 4000 µm and 5000 µm. Such pellets of PLA can be obtained after polymerization per extrusion while passing the PLA through a die whose openings have corresponding dimension. In this case, the grinding of PLA pellets can be carried out by various types of grinders, such as for example a grinder with a disc, a mill, or an electromagnetic grinder, for example with a piston. Grinding can be done at room temperature or cryogenically, i.e. carried out at a temperature ranging between −10 and −200° C., preferentially between −20 and −100° C. Cryogenic grinding allows in particular to avoid yellowing of the articles obtained and to obtain a highly grinded powder flow. Cryogenic grinding also makes it possible to produce a powder without filaments, this being particularly adapted to the rotomoulding application. Grinding can be carried out under inert atmosphere, i.e. in the absence of oxygen; for example under nitrogen.

After grinding, it is possible to measure and/or modify the granulometry of the PLA by using rotating sieves. To determine the granulometry of the PLA one can use a method of sieving, for example, by using sieves of different mesh sizes, or with a laser i.e. a Malvern Mastersizer.

In the present invention, one defines the PLA whose average particle size lies between 20 µm and 2000 µm which was obtained from grinding PLA pellets with initial dimensions greater than 2000 µm "PLA powder". The PLA used in layer B1 can be either in the form of powder, or in the form of micropellets, or in the form of a mixture of powder and micropellets. The powder or micropellets of PLA can be used as they are without the addition of other compounds or they can be mixed with various compounds, loads, agents and/or additives, as described for the PLA of layer A.

In particular embodiments, layer B1 comprises 50 to 99.9 wt % of the polyester and from 0.1 to 10 wt % of a co- or ter-polymer comprising a) 50 to 99.9 wt % of an ethylene or a styrene monomer,
b) 0.1 to 50 wt % of an unsaturated anhydride-, epoxide- or carboxylic acid-containing monomer,
c) 0 to 50 wt %, preferably 0.1 to 30 wt %, (meth)acrylic ester monomer.

The co- or ter-polymer can be the same as or different from the co- or ter-polymer present in layer A. The description of the co- or ter-polymer present in layer A applies mutatis mutandis to the co- or ter-polymer in layer B1, which can be the same as or different from any co- or ter-polymer present in layer A.

The composition for layer B1 can be in powder or micropellet form, or a blend of both, suitable for rotational moulding.

Layer B1 is preferably adjacent to layer A. The polymer compositions of layer A and B1 typically exhibit an excellent adherence between the two rotomoulded layers.

In particular embodiments, the rotomoulded article comprises a layer A and B1.

In a particular embodiment, the rotomoulded article may comprise two layers: layer A and layer B1, wherein:

layer A is the outer layer,
layer B1 is adjacent to layer A, and comprises from 50 wt % to 100 wt % of a polyester, preferably from 80 wt % to 100 wt %, more preferably from 95 wt % to 100 wt %.

In certain embodiments, layer B1 is the inner layer. This is particularly advantageous when it is envisaged to fill the rotomoulded article with a polyurethane. Although the inventors have found that polyurethane adhere well particularly well on layer A, the increased polyester content of layer B1 allows for an enhanced foam adherence. Thus, in such embodiments, layer A provides the required strength and protection against deformation of the article, while layer B1 provides an enhanced adherence to a polyurethane, such as a polyurethane foam.

3 Layer B

In an embodiment, the article can comprise at least one layer B comprising from 50 to 100 wt % of a polyolefin, said layer B being preferably adjacent to layer A.

3.1 Polyolefin

Layer B can comprise a polyolefin. The polyolefin is preferably present in an amount ranging from 50 wt % based on the total weight of layer B, for example ranging from 60 wt %, for example ranging from 70 wt %, for example ranging from 80 wt %, for example ranging from 90 wt %, for example ranging from 95 wt %, up to 100 wt % of layer B, or up to 100% for example up to 99.8 wt %, for example up to 99 wt %, for example up to 97.5 wt %, for example up to 97 wt %, or for example up to 95 wt % wt % of layer B.

The polyolefin can be the same as or different from the polyolefin present in layer A.

The polyolefin can be selected from polyethylene, polypropylene, polybutene or polyhexene.

Preferably, the polyolefin is polyethylene. The description of polyethylene present in layer A applies mutatis mutandis to the polyethylene in layer B, which can be the same as or different from any polyethylene present in layer A.

The composition for layer B can be in powder or micropellet form, suitable for rotational moulding. When optional chemical blowing agent is present and micropellets are used, the polyolefin and chemical blowing agent are preferably compounded together instead of dry blended.

3.2 the Polyolefin Optionally Foamed—Chemical Blowing Agents

Optionally, layer B is a foamed polyolefin layer. In order to foam polyolefin a chemical blowing agent can be included into layer B, which causes the polyolefin to foam under the appropriate conditions in the presence of a blowing gas in the mould during rotational moulding. The chemical blowing step generally fulfils several requirements:

the decomposition temperature range of the blowing agent is compatible with the processing temperature of the polyolefin;

the liberation of the blowing gas occurs within a defined temperature range of about 10° C. and is controllable during the process;

the decomposition is not autocatalysed in order to avoid overheating;

the blowing gas is chemically inert, such as preferably nitrogen, carbon dioxide and water;

the chemical blowing agent is homogeneously and easily incorporated in and compatible with polyethylene.

During the foaming process, at elevated temperatures, chemical blowing agents undergo chemical reactions that liberate gas, typically $N_2$, CO, $CO_2$ and $NH_3$ and water.

The chemical agents that can be used in the present invention can function according to three main processes:

Irreversible reaction: AB-->C+gas. They can be selected from the group comprising azo compounds, hydrazine derivatives, semicarbazides, tetrazoles and nitroso compounds.

Equilibrium reactions: AB<--->C+gas. They can be selected from the group comprising bicarbonates and carbonates.

Combination of compounds that liberate gases as a result of their chemical interactions: A+BG-->AB+gas.

The chemical blowing agents can be:

Exothermic, such as for example azodicarbonamide (AZ) or 4,4'-oxy-bis(benzenesulfonylhydrazide) (OB); or Endothermic, such as for example sodium bicarbonate (SB).

Suitable chemical blowing agents include:

Organic Chemical Blowing Agents:

Azo compounds such as for example azodicarbonamide decompose at a temperature range of from 160 to 215° C. and liberate about 220 ml/g of gas, mostly $N_2$, CO, $CO_2$, $NH_3$ and water.

Hydrazides such as for example or 4,4'-oxy-bis(benzenesulfonylhydrazide) (from example Genitron®OB from LANXESS). It decomposes at a temperature range of from 140 to 160° C. and liberates 120 to 140 ml/g of gas, mostly $N_2$ and $H_2O$. This type of agent is particularly preferred as it is exothermic and releases only neutral gases.

Other examples include modified azodicarbonamide, i. e., azodicarbonamide modified with zinc oxide, calcium carbonate or the like to lower the decomposition temperature, 5-phenyltetrazole, dinitrosopentamethylene tetramine, azobisisobutyronitrile, diazoaminobenzene, oxybis(benzenesulfonylhydrazide) and the like.

Inorganic Chemical Blowing Agents:

Carbonates such as for example sodium bicarbonate $NaHCO_3$. It decomposes at a temperature range of from 150 to 230° C. and liberates 140 to 230 ml/g of gas, mostly $CO_2$ and $H_2O$.

Other examples include sodium borohydride, ammonium carbonate, and modified sodium bicarbonate, i.e. sodium bicarbonate modified with a proton donor such as citric acid, and the like.

The amount of blowing agent added to the polyolefin can be of at least 0.2 wt % based on the total weight of layer B, preferably of at least 1 wt %. It is of at most 5 wt %, preferably of at most 3 wt %. The most preferred amount is of about 2.5 wt %. The chemical blowing agent totally decomposes upon foaming.

3.3 Preparing the Optionally Foamed Polyolefin Layer B

The foamed polyolefin layer can be prepared by standard techniques with one or more chemical blowing agent(s). The chemical blowing agent can be incorporated into the polyolefin to form a blend. The blend may be prepared by extruding the polyolefin either with a masterbatch comprising the chemical blowing agent or directly with the blowing agent. In both cases, it is preferred that the extrusion temperature is kept above the melt temperature of the polyolefin but below the decomposition temperature range of the chemical blowing agent(s). The melt can then be passed through a suitable die, such as used with a pelletizer, to obtain the pelletized resin.

Alternatively, and preferably, the polyolefin can be dry blended with the chemical blowing agent(s) and introduced directly into the mould during the rotomoulding cycle. Dry blending is favoured over compounding the chemical blowing agent with the polyolefin, because the mixing has to be carried out below the decomposition temperature of the chemical blowing agent.

While it is not necessary, additives which function to control or modify foam cell size or foam density or modify/control the activator temperature or rate of decomposition of the chemical blowing agent may also be included in the polyolefin. Useful additives of this type include calcium carbonate, titanium dioxide, zinc oxide, talc, calcium stearate, nanocomposites and the like. When present, the amount of these additives typically ranges from about 0.01 wt % to about 1 wt % (percent by weight), based on the weight of the foamed polyolefin layer.

The preferred density of the foamed layer is between 100 to 200 kg/m³.

The preferred thickness of the foamed layer can be ranging from 10 to 500 mm, preferably from 100 to 200 mm, according to the desired use of the rotomoulded article.

3.4 Further Optional Components

In another embodiment, layer B may also comprise other components besides the polyolefin. For example, it may comprise:

- from 50 to 99.5 wt %, preferably 60 to 99.4 wt %, of the polyolefin, which can be different from the polyolefin of layer A,
- from 0 to 50 wt %, preferably 0.5 to 50 wt %, more preferably 0.5 to 30 wt %, of a polyester (preferably PLA), which can be different from the polyester of layer A,
- from 0 to 20 wt %, preferably 0.1 to 15 wt %, of a co- or ter-polymer, which can be different from the co- or ter-polymer of layer A, comprising:
  a) 50 to 99.9 wt % of an ethylene or a styrene monomer,
  b) 0.1 to 50 wt % of an unsaturated anhydride-, epoxide- or carboxylic acid-containing monomer,
  c) 0 to 50 wt % (meth)acrylic ester monomer.

The description of the polyester (section 1.2 above) and the co- or ter-polymer (section 1.4 above) present in layer A applies mutatis mutandis to layer B. The optional polyester (preferably PLA) and the optional co- or ter-polymer can be the same as or different from those present in layer A.

Thus, layer B can be the same as or different from layer A.

4 Layer C

The article may comprise yet a further layer C comprising from 50 to 100 wt % of a polyolefin. The polyolefin can be different from the polyolefin of layer A.

4.1 Polyolefin

Layer C is preferably adjacent to layer B. In a particular embodiment, layer C is adjacent to layer B if present, which is adjacent to layer A. Layer A is preferably the outer lay in this case, optional layer B in the intermediate layer and layer C the inner layer. Layer C can be the same as or different from layer A.

Layer C comprises a polyolefin. The polyolefin is preferably present in an amount ranging from 50 wt % based on the total weight of layer C, for example ranging from 60 wt %, for example ranging from 70 wt %, for example ranging from 80 wt %, for example ranging from 90 wt %, for example ranging from 95 wt %, up to 100 wt % of layer C, or up to 100% for example up to 99.8 wt %, for example up to 99 wt %, for example up to 97.5 wt %, for example up to 97 wt %, or for example up to 95 wt % wt % of layer C.

The polyolefin can be the same as or different form the polyolefin present in layer A.

The polyolefin can be selected from polyethylene, polypropylene, polybutene or polyhexene.

Preferably, the polyolefin is polyethylene. The description of polyethylene present in layer A applies mutatis mutandis to the polyethylene in layer C, which can be the same as or different from any polyethylene present in layer A.

The composition for layer C can be in powder or micropellet form, suitable for rotational moulding.

4.2 Further Optional Components

In another embodiment, particularly when layer C is the inner, layer C may also comprise other components besides the polyolefin. For example, it may comprise:

- from 50 to 99.5 wt %, preferably 60 to 99.4 wt %, of the polyolefin, which can be different from the polyolefin of layer A,
- from 0 to 50 wt %, preferably 0.5 to 50 wt %, more preferably 0.5 to 30 wt %, of a polyester (preferably PLA), which can be different from the polyester of layer A,
- from 0 to 20 wt %, preferably 0.1 to 15 wt %, of a co- or ter-polymer, which can be different from the co- or ter-polymer of layer A, comprising:
  a) 50 to 99.9 wt % of an ethylene or a styrene monomer
  b) 0.1 to 50 wt % of an unsaturated anhydride-, epoxide- or carboxylic acid-containing monomer
  c) 0 to 50 wt % (meth)acrylic ester monomer The description of the polyester (section 1.2 above) and the co- or ter-polymer (section 1.4 above) present in layer A applies mutatis mutandis to layer C. The optional polyester (preferably PLA) and the optional co- or ter-polymer can be the same as or different from those present in layer A. Thus, layer C can be the same as or different from layer A.

5 the Rotomoulding Process

The rotomoulded article according to the invention comprises at least one layer, namely layer A. The article can be a mono-layered article only having layer A, or it can be a bi-layered or tri-layered rotomoulded article.

According to the invention, the article may further comprise a layer B1 and/or B, preferably adjacent to layer A. In addition, a third layer, layer C, can be present, preferably adjacent to layer B.

The rotational moulding is a process well-known to the person skilled in the art. The various processes of rotational moulding usually comprise the following stages:
  a) loading of the mould,
  b) rotation of the mould,
  c) heating of the mould,
  d) cooling and
  e) release from the mould.

The mould can be made of any material known in the art for such a purpose. For example, the mould can be an aluminum mould or a Teflon mould. Teflon moulds are preferred to avoid any sticking to the mould due to the decreased shrinkage and warpage according to the article of the invention.

The rotation of the mould is generally carried out around two perpendicular axes.

The quantity of powder and/or of micropellets introduced into the mould depends on the size of the article and on the desired wall thickness.

The heating step (c) of the mould occurs simultaneously with the rotation of the mould in step (b).

In one embodiment, the heating step can be carried out in an oven or by electric heating elements. In another preferred embodiment heating can be carried out with a mould heated by an oil-filled heating jacket, as in for example, the Leonardo® rotomoulding machine from Persico®. The heating temperature of the oven, electric heating elements or oil can vary from 150 to 350° C. One generally uses a temperature of at least of 10° C. higher, preferentially at least of 20° C. higher, more preferentially at least of 30° C. higher compared to the melting point of the layer that one wishes to mould. A heating temperature ranging from 180 and 270° C. is preferably used. In another embodiment, heating can also be carried out by microwaves.

The duration of the moulding varies according to dimensions and the thickness of rotomoulded article, it can be range from 5 to 600 minutes.

The duration and the time of cooling step depends on the installation, on the dimensions of the article to be moulded and of the type of article which one wishes to obtain. As mentioned previously, it is possible to cool the mould and/or the article contained in the mould. To cool the mould from the outside, one can use air at room temperature, water between 5 and 25° C. or oil between 5 and 80° C. To cool the article from the inside of the mould, one can inject air and/or inert gas such as nitrogen and/or spray water (like a mist) within the interior of the mould, for example at a temperature of 25° C. The time of cooling generally varies between 5 and 500 minutes depending on the thickness of the rotomoulded article and the process used for cooling. When the article has a thickness of more than 10 mm, the mould should preferably be cooled from both the inside of the mould and the outside, preferably using ar or inert gas such as nitrogen or a spray of water (mist).

According to a mode of realization, the cooling of the mould and/or article obtained are done in just one step until a temperature ranging between room temperature and a temperature lower than 100° C. is obtained.

Thereafter, the article is released from the mould.

The rotational moulding can be carried out under inert gas in the absence of oxygen. In order to do so, one can for example add into the mould a compound which liberates carbon dioxide, such as dry ice. This can be for example together with the powder or pellets of the different components. Dry ice generates carbon dioxide during the heating and rotating steps of the moulding process. One can also purge the mould with an inert gas, such as nitrogen, by injecting nitrogen after closing the mould.

The walls of the articles can comprise one or more successive layers, at least having layer A as claimed. It is thus possible to manufacture articles with walls comprising for examples two or three layers e.g. optionally having a layer B1, and/or a layer B and/or a layer C. In one embodiment, layer B can be foamed.

In a particular embodiment, layer A is the outer layer, layer B1 is the inner layer.

In a particular embodiment, layer A is the outer layer, layer B is the intermediate layer and layer B1 is the inner layer.

In a particular embodiment, layer A is the outer layer, layer B is the intermediate layer and layer C is the inner layer. In this particular embodiment, layer C may further comprise a polyester and optionally a co- or terpolymer according to the same definitions as in layer A. Layer C can be same as or different from layer A.

In another embodiment, layer A is the intermediate layer adjacent to layers B and C, wherein layers B and C are either the outer or inner layers respectively. Layers B and C can be same or different in this embodiment.

There are several known methods to manufacture multi-layered rotomoulded articles: by manual introduction of material during the rotomoulding cycle, or by the use of a drop-box, or by a one-shot system wherein each layer has a different melting temperature and are introduced into the mould together.

Manual addition involves moving the mould from the oven, removing a vent tube or plug that creates an opening in the part and adding more material using a funnel or wand. This operation must be repeated for each additional layer.

A drop-box typically contains the material for a particular layer and it is an insulated container that holds material until it is released at the appropriate time during the cycle. The signal for release of material is usually transmitted as a pressure pulse via the airline through the arm of the machine. The insulation is kept cool to prevent the material inside the box from melting.

In either of these two methods, there are two factors, which are known to the skilled person in multilayered rotomoulding applications:
i. the temperature at which the subsequent layer is added for determining the wall thickness of the previous skin formed and how well the two layers may be bound together;
ii. the time elapsed before addition of the subsequent layer of material to avoid sag.

It is possible to control these by lowering the melt index of the first layer and/or by reducing the injection temperature of the next layer, and/or by cooling the mould slightly before injection of the next layer.

The cycle time necessary to produce multilayer rotomoulded articles depends upon the number of layers and upon the mass injected for each layer.

The present invention also discloses a method for rotomoulding the articles according to the invention for one or more layers comprising the steps of (in no particular order) according to the process known to the skilled person:
a) feeding the composition for layer A) into a mould;
b) placing the filled mould in pre-heated oven;
c) rotating the filled mould about two perpendicular axes;
d) optionally feeding the composition for layer B1, followed by repeating steps (b) and (c);
e) optionally feeding the composition for layer B, optionally with a chemical blowing agent and blowing gas to prepare a foamed layer B, followed by repeating steps (b) and (c);
f) optionally feeding the composition for layer C), followed by repeating steps (b) and (c);
g) optionally feeding desired additional layers, each addition followed by repeating steps (b) and (c).
h) cooling and retrieving the rotomoulded article Preferably, the process is carried out in the order described.

The time at which the temperature inside the mould reaches the melting temperature of the composition for layer A, can be used to determine the injection point of layer B1 and/or B:

Composition for layer B1 (if adjacent to layer A) comprising polyester can be injected as soon as or just before that first melting temperature is reached.

Composition for layer B (if adjacent to layer A) comprising polyolefin (and optionally a chemical blowing agent) is injected as soon as or just before that first melting temperature is reached. The composition for layer B is preferably injected at an internal air temperature situated between 125 and 160° C.

The time at which the temperature inside the mould reaches the melting temperature of composition for layer B, can be used to determine the injection point of layer C. Composition for layer C is injected as soon as or just before that second melting temperature is reached. The composition for layer C is injected at an internal air temperature situated between 125 and 160° C. The internal air temperature must be compatible with the temperature and is preferably of at most 170° C. during the whole cycle time.

The articles obtained by rotational moulding are generally hollow parts without any welding lines, such as for examples structural parts, tanks, drums, containers, vats, jerrycans, cans, cisterns, boxes, bumpers, furniture (bath tubs), car parts such as car doors, car bodies and car seats, nautical and aquatic equipment, buoys, floats, airplane parts, boards, planks and joints. The rotomoulded article is preferably selected from the group comprising car parts. Among the car parts, one can for example quote the car body and car door and interior components such as the instrument panel and door handles.

These articles can have one or more openings and/or inserts of plastic or metal and/or "kiss offs" which are reinforcing junctions or bridges between two surfaces within the article.

Articles obtained by the rotational moulding process according to the invention do not have a point of weakness. They show homogeneous characteristics, such as for example a uniform thickness of the walls as well as a good surface aspects both internally and internally and externally, without any deformation, bubble or other defects. In addition, the compositions for use in the present process do not present any sagging behaviour during the rotomoulding process.

In particular, the articles obtained have a very little shrinkage and warpage. In addition, the presence of the co- or terpolymer (compatibilising agent) increases the impact strength of the article. In addition, the presence of the ionomer increases the resistance to hydrolysis of the polyester such as PLA present in the articles, and thereby prevents and/or slows down the degradation of the article.

Note, also when layer A is the outer layer they can be painted very easily because of the high surface tension due to the presence of polyester.

6 Filling with Polyurethane

The articles obtained by rotational moulding are generally hollow parts without any welding lines. Being hollow the rotomoulded articles according the present invention typically comprise one or more cavities. In an embodiment, enhanced insulation properties or structural properties can be obtained by filling these cavities with a polyurethane (PU), such as a polyurethane foam.

The inventors surprisingly found that for the rotomoulded articles according to the present invention the adherence between the article inner wall and a PU foam is excellent.

Accordingly, in particular embodiments, the present rotomoulded articles comprise at least one cavity which comprises, preferably which is filled with a polyurethane, such as a polyurethane foam.

PU foams can greatly enhance the structural and insulating properties of the rotomoulded article, without adding much weight to the article. The PU foam may be a rigid, semi-rigid, or soft PU foam. Rigid PU foams are preferred to enhance the structural properties of the rotomoulded article. The softness and elastic properties of the polyurethane foams depend on the choice of the polyol and isocyanate monomers, as the polyol monomers typically provide soft domains, and the isocyanate monomers form harder domains.

The type of PU polymer comprised by the PU foam is not critical to the present invention. The PU polymer may be made by introduction into the rotomoulded article of a PU forming composition as described below.

The filling with PU foam can be obtained by introducing a PU forming composition into one or more cavities of the rotomoulded article.

In general, such a PU forming composition comprises:
at least one isocyanate compound, hereinafter also referred to as "isocyanate monomer"; and
at least one polyol, hereinafter also referred to as "polyol monomer".

Suitable isocyanate monomers include polyisocyanates, such as diisocyanates and/or triisocyanates. The polyisocyanates may be aliphatic, araliphatic and/or aromatic polyisocyanates, typically of the type $R^2$—$(NCO)_x$ with x being at least 2 and $R^2$ being an aromatic, aliphatic or combined aromatic/aliphatic group. Examples of $R^2$ are diphenylmethane, toluene, dicyclohexylmethane, hexamethylene, or groups providing a similar polyisocyanate.

Non-limiting examples of suitable polyisocyanates are diphenylmethane diisocyanate (MDI)—type isocyanates in the form of its 2,4'-, 2,2'- and 4,4'-isomers and mixtures thereof (also referred to as pure MDI), the mixtures of diphenylmethane diisocyanates (MDI) and oligomers thereof (known in the art as "crude" or polymeric MDI), and reaction products of polyisocyanates (e.g. polyisocyanates as set out above), with components containing isocyanate-reactive hydrogen atoms forming polymeric polyisocyanates or so-called prepolymers. Other examples are tolylene diisocyanate (also known as toluene diisocyanate, and referred to as TDI), such as 2,4 TDI and 2,6 TDI in any suitable isomer mixture, hexamethylene diisocyanate (HMDI or HDI), isophorone diisocyanate (IPDI), butylene diisocyanate, trimethylhexamethylene diisocyanate, di(isocyanatocyclohexyl)methane, e.g. 4,4'-diisocyanatodicyclohexylmethane (H12MDI), isocyanatomethyl-1,8-octane diisocyanate and tetramethylxylene diisocyanate (TMXDI), 1,5-naphtalenediisocyanate (NDI), p-phenylenediisocyanate (PPDI), 1,4-cyclohexanediisocyanate (CDI), tolidine diisocyanate (TODD, any suitable mixture of these polyisocyanates, and any suitable mixture of one or more of these polyisocyanates with MDI-type polyisocyanates.

The polyurethane is generally prepared by reacting an isocyanate monomer with one or more polyol monomers. Suitable polyol monomers include a hydroxyl terminated polyester (polyester polyols), a hydroxyl terminated polyether (polyether polyols), a hydroxyl terminated polycarbonate, or a mixture thereof. In particular embodiments, the polyol monomers comprise one or more monomers selected from the group comprising a polyether diol, a polyether triol, a polyester diol, and a polyester triol.

The polyester polyols may be generally a linear polyester, and may have an average molecular weight (Mn) of from about 500 to 10000. The molecular weight may be determined by assay of the terminal functional groups and is related to the number average molecular weight. The polymers can be produced by (1) an esterification reaction of one or more glycols with one or more dicarboxylic acids or anhydrides or (2) by transesterification reaction, i.e. the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from caprolactone and a bifunctional initiator such as diethylene glycol. The dicarboxylic acids of the desired polyester can be aliphatic, cycloaliphatic, aromatic, or combinations thereof. Suitable dicarboxylic acids which can be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like.

Polyether polyols may be derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethyl glycol) (PTMG) comprising water reacted with tetrahydrofuran (THF). Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of glycerol and ethylene oxide or glycerol and propylene oxide.

Hydroxyl terminated polycarbonate intermediates can be prepared by reacting a glycol with a carbonate. U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecule with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, hexanediol-1,6, 2,2,4-trimethylhexanedion-1,6, decanediol-1,10, hydrogenated dilinoleylglycol, hydrogenated diolelylglycol; and cycloaliphatic diols such as cyclohexanediol-1,3, dimethylolcyclohexane-1,4, cyclohexanediol-1,4, dimethylolcyclohexane-1,3, 1,4-endomethylene-2-hydroxy-5-hydroxymethyl cyclohexane, and polyalkylene glycols. The diols used in the reaction may be a single diol or a mixture of diols depending on the properties desired in the finished product.

Non-limiting examples of suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate and 2,4-pentylene carbonate.

Also suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° C. to 300° C. and at a pressure in the range of 0.1 to 300 mm Hg in the presence or absence of an ester interchange catalyst, while removing low boiling glycols by distillation.

In particular embodiments, the PU forming composition can comprise one or more polyether diols or triols. The choice of polyol monomer may depend on the required specifications of the rotomoulded, PU filled article. For example, polyethers typically provide a better microbial and fungal resistance, are easier to process (due to the lower viscosity), and have a lower cost, compared to polyesters. On the other hand, polyesters may provide a better wear resistance; load bearing properties; heat aging properties; reactivity; and oxygen, ozone and UV stability. Polyesters may further swell less in oils, grease and solvents.

The PU forming composition may further comprise one or more chain extenders, all of which are well known to those skilled in the art. Non-limiting examples of suitable chain extenders are lower aliphatic or short chain glycols having from about 2 to about 10 carbon atoms and include, for instance, ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol, hydroquinone di(hydroxyethyl)ether, neopentylglycol, and the like.

In particular embodiments, the PU formulation can comprise one or more catalysts, for example selected from the group comprising a tertiary amine, such as bis-(2-dimethylaminoethyl)ether, N-ethylmorpholine, triethylenediamine, dimethylcyclohexylamine, or dimethylethanolamine; and an organotin compound, such as dibutyltin dilaurate, dioctyltin mercaptide, or dibutyltin oxide.

In certain embodiments, the PU forming composition may comprises one or more mineral fillers such as certain oxides, carbonates, silicates, borates, stannates, mixed oxide hydroxides, oxide hydroxide carbonates, hydroxide silicates, or hydroxide borates, or a mixture of these substances. By way of example, use may be made of calcium oxide, aluminum oxide, manganese oxide, tin oxide, boehmite, dihydrotalcite, hydrocalumite, or calcium carbonate.

In certain embodiments, the PU forming composition may comprise one or more foam stabilizers. Foam stabilizers are substances which promote the formation of a regular cell structure during foaming. Non-limiting examples of foam stabilizers are silicone-comprising foam stabilizers such as siloxane-oxalkylene copolymers or other organopolysiloxanes, alkoxylation products of fatty alcohols, oxo alcohols, fatty amines, alkylphenols, dialkylphenols, alkylcresols, alkylresorcinol, naphthol, alkylnaphthol, naphthylamine, aniline, alkylaniline, toluidine, bisphenol A, alkylated bisphenol A, and polyvinyl alcohol.

The PU forming composition can further comprise one or more solvents, as known by the person skilled in the art.

The polyurethane is generally made from the abovementioned polyol monomer, preferably polyether, which is further reacted with an isocyanate monomer, preferably a diisocyanate, along with one or more additives selected from a chain extender, a catalyst, a foam stabilizer, a filler, a dye, a pigment, a flame retarder, an antioxidant, a fungicide, and a biocide.

Foams can be made by using chemical or inert blowing agents while conducting above reactions, or by using a gas in order to create a froth during these reactions. A particularly suitable chemical blowing agent is water. Water can react with isocyanate functional groups, thereby releasing carbon dioxide, which can act as blowing gas. Accordingly, in particular embodiments, the PU forming composition comprises water.

The amount of blowing agent present in the PU forming mixture influences the density of the PU foam formed by the PU forming composition.

7 Coating of the Rotomoulded Article

The inventors have found that the rotomoulded articles of the invention are easy to coat or paint. Surprisingly, the inventors further found that the rotomoulded articles can be coated as soon as the articles are demoulded, without any surface treatment.

The rotomoulded articles described herein may be coated for various purposes, for example for aesthetic reasons, for providing fire-retardant properties, for providing hydrophilic or hydrophobic properties, for protecting the surface against uv-light, scratching, heat, etc.

In particular embodiments, the rotomoulded article described herein is painted. Suitable paints which provide good results include polyurethane-based paints, epoxy based paints, and nitrocellulose-based paints, acrylic paints, and alkyd paints. In preferred embodiments, the paint is selected from the group comprising polyurethane-based paints, epoxy based paints, and nitrocellulose-based paints. The adherence of the paint was tested via a cross-cut test according to NF EN ISO 2409.

In particular embodiments, the article is painted or coated with a flame-retardant substance, for example a flame-retardant paint or varnish. In particular embodiments, the articles may comprise a flame-retardant coating, wherein said coating preferably comprises one or more intumescent substances, i.e. substances that swell as a result of heat exposure, thus increasing in volume and decreasing in density, thereby providing a passive fire protection. Examples of intumescents include sodium silicates and materials which comprise a significant amount of hydrates.

In certain embodiments, the rotomoulded article is coated with a topcoat. Non-limiting examples of topcoat materials include a polyester resin, an amino resin, or isophthalic pre-accelerated unsaturated polyester such as Polycor iso PA F from CCP composites, or combinations thereof, or is. Such articles may be car parts, boat parts, or the like.

The coatings described herein may be applied by any suitable coating technique, including but not limited to spray coating, and dip coating.

The invention will now be illustrated by the following, non-limiting illustrations of particular embodiments of the invention.

EXAMPLES

Analytical Methods

1. Determination of the Optical Purity of the PLA

In the examples which follow, the determination of the optical or isomeric purity of the PLA is done by the enzymatic method. The principle of the method is the following: The ions Lactate and D-Lactate are oxidized in pyruvate respectively by the enzymes L-lactate dehydrogenase and D-lactate dehydrogenase using the nicotinamide adenine dinucleotide (NAD) as the coenzyme. To force the reaction in the direction of pyruvate formation, it is necessary to trap this compound by reaction with hydrazine. The optical density increase to 340 Nm is proportional to the quantity of L-lactate or D-lactate present in the sample.

The samples of PLA were prepared by mixing 25 ml of sodium hydroxide (1 mol/L) with 0.6 g of PLA. The solution was refluxed for 8 hours and then cooled. The solution was then neutralized to pH 7 using a hydrochloric acid solution (1 mol/L), then sufficient deionized water was added to obtain 200 ml of solution.

The samples were then analyzed on a Vital Scientific Selectra Junior analyzer used for the determination of L isomer of the poly-L-lactide, the box entitled "L-lactic acid 5260" marketed by the company Scil was used and for the determination in D isomer of the poly-D-lactide, the box entitled "L-lactic acid 5240" marketed by the company Scil was used. During the analysis, a reactive blank and a calibration solution called "Scil 5460" were used.

2. Determination of the Molecular Weight of the PLA

In the examples which follow, the measurement of the molecular weight is carried out at 30° C. by using a liquid chromatograph WATERS 610. A solution of the polymer in chloroform at a concentration of 1 mg/mL was prepared. 100 µl of this solution is injected, through a filter having pores of 0.2 µm in diameter, in the column of the chromatograph at 30° C. The molecular weight is given on the basis of the retention time in the column. One sample is carried out as the reference using standard polystyrene samples and a universal calibration curve.

Example 1

Resins Used in the Examples

The resins identified hereafter were used:
Polyolefin

As the polyolefin, a polyethylene resin was used, more particularly M4041 UV® from Total Petrochemicals. The white polyethylene powders were obtained after grinding the polyethylene pellets. The polyethylene having a density of 0.940 g/cm$^3$ (ISO 1183) and melt index MI2 of 4 g/10 min (ISO 1133 condition D under a load of 2.16 kg at 190° C.). The average particle size of the powder after grinding is of 300 µm. The polyethylene was prepared with ethylene bis(tetrahydroindenyl) zirconium dichloride catalyst. The tensile modulus is around 800 MPa measured according to ISO527.
Polyester As the polyester a PLA was used, namely a poly-L-lactide (PLA HIGH PURITY from Futerro®) in the form of powder obtained after grinding pellets of PLLA having an optical purity of at least 99% w/w, a water content of maximum 250 ppm, free lactide content of maximum 0.1% w/w and a number average molecular weight Mn of approximately 100,000 (using a polystyrene reference). The average particle size of the particles of the powder after grinding is of 300 µm.

Physical Properties of the PLA:
Specific Gravity at 25° C. of 1.24 measured according to ISO 1183.
Melt density at 230° C. of 1.08-1.12.
Melt index measured at 190° C. under a load of 2.16 kg of 10-30 g/10 min measured according to ISO 1133.
Melt index measured at 210° C. under a load of 2.16 kg of 30-60 g/10 min measured according to ISO 1133.
Haze at 2 mm thickness of less than 5%, measured according to ISO 14782.
Transmittance at 2 mm thickness of greater than 90%, measured according to ISO 14782/
Glass transition temperature of 52-60° C. measured according to ISO 11357.

Crystalline melt temperature of 145-175° C. also measured according to ISO 11357.

The tensile modulus is around 4000 MPa measured according to ISO527.

Ionomer

Surlyn® 1650 E (sold by DuPont) was used as ionomer. Surlyn® 1650 E is a zinc ionomer, more particularly a copolymer of ethylene and methacrylic acid.

Copolymer

Lotader 8840® (sold by Arkema®) was used as the optional copolymer compatibilising agent. LOTADER® AX8840 is a random copolymer of ethylene and glycidyl methacrylate, polymerized under high-pressure in an autoclave process.

Physical properties of Lotader® as sold:
Melt index measured at 190° C. under a load of 2.16 kg of 5 g/10 min measured according to ISO 1133
Glycidyl methacrylate content of 8 wt % as measured by FTIR
Ethylene monomer of 92 wt % as measured by FTIR
Density (at 23° C.) of 0.94 g/cm$^3$ measured according to ISO 1183
Melting point at 106° C. measured according to ISO 11357-3

The following are given as physical properties measured on compression moulded samples:
Vicat softening point (at 10N) of 87° C. measured according to ISO 306
Tensile modulus of 104 MPa measured according to ISO 527-2
Flexural modulus of 85 MPa measured according to ISO 178
Elongation at break of 400% measured according to ISO 527-2
Tensile strength at break of 8 MPa measured according to ISO 527-2
Hardness Shore D (at 1s) of 50 measured according to ISO 868

Compositions for Layer A:
The following compositions for layer A were prepared.
Composition 1 (reference):
Polyethylene: 88 wt %
PLA: 10 wt %
Ionomer: absent
Copolymer: 2 wt %
Composition 2:
Polyethylene: 87 wt %
PLA: 10 wt %
Ionomer: 1 wt %
Copolymer: 2 wt %

Compositions 1 and 2 were compounded on a co-rotative twin screw extruder (60 mm diameter, L/D=40).

Machine and Mould Configuration

A carousel oven machine was used, wherein the process with following conditions were present:
Oven set temp for all trials 270° C.
Aluminium moulds
External air cooling only. Air was used at room temperature (between 20 to 25° C.)
Manufacture of single layered article by rotational moulding: single layered bottles were prepared.

These were carried out on a "FERRY Rotospeed RS2—160 Independent Arm" rotomoulding machine having a swing diameter of 1.6 m.

The parameters were the following:
Heating of the oven to a temperature of 300° C.
PIAT (peak internal air temperature): 230° C.
rotational ratio: 4/1
Cooling of the mould from the outside from 230° C. at a rate of 3° C./minute using air at room temperature to 50° C.
Release from the mould at 50° C.

Composition 1 and composition 2 as mentioned above were used separately to form bottles.

The Charpy impact strength was tested on injection moulded samples according to ISO 179/1eU and 1eA at 23° C. The tensile modulus was measured according to ISO527. Surprisingly, the presence of 1 wt % of ionomer according to the invention greatly improves the impact strength of the sample. The presence of an ionomer (Surlyn®) improves the mechanical properties of the composition such as impact strength, as can be seen in Table 1 below. As a further reference, also a sample was prepared using 100% polyethylene.

TABLE 1

| Composition | Notched Charpy Impact test ISO 179/1eA at 23° C. (in kJ/m$^2$) | Tensile modulus ISO 527 MPa |
|---|---|---|
| 100 wt % of mPE M4041UV | 22 | 612 |
| Composition 1 (no ionomer) | 22.9 | 741 |
| Composition 2 | 32 | 710 |

Example 2: Hydrolysis Test 10 g of the compositions 1 and 2 as prepared in Example 1, were each separately placed in water at 60° C. The pH of the obtained suspension was recorded as a function of time. A first test was performed using double distilled water; the results are shown in FIG. 1. A second test was performed using standard tap water; the results are shown in FIG. 2. pH below 7 points out PLA hydrolysis (Lactic acid production).

Figure 2:
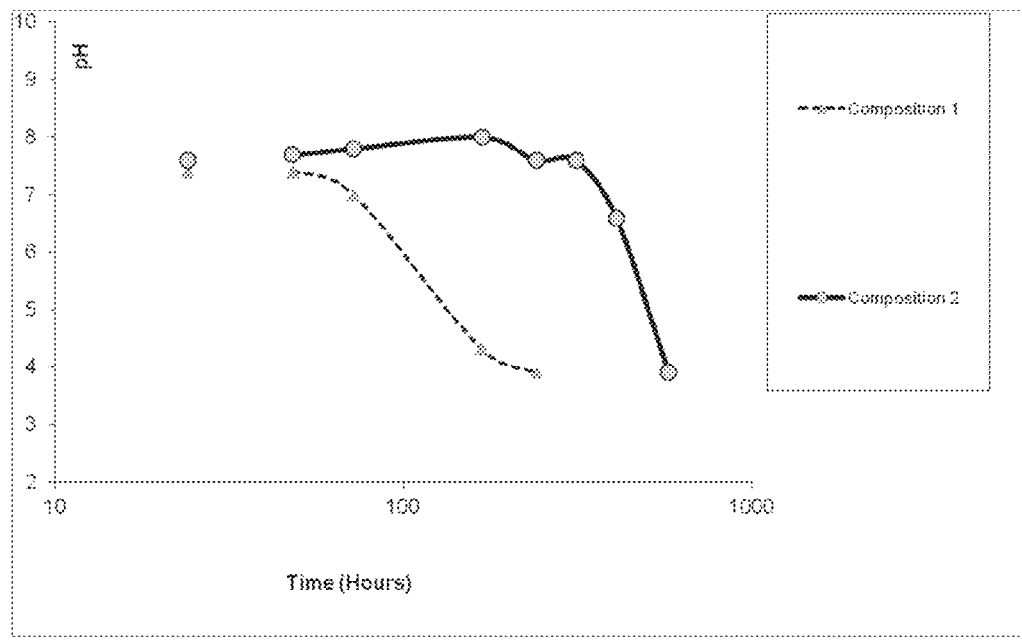
FIG. 2 represents a graph plotting the pH of compositions 1 and 2 when added to tap water as a function of time.
Figure 3:
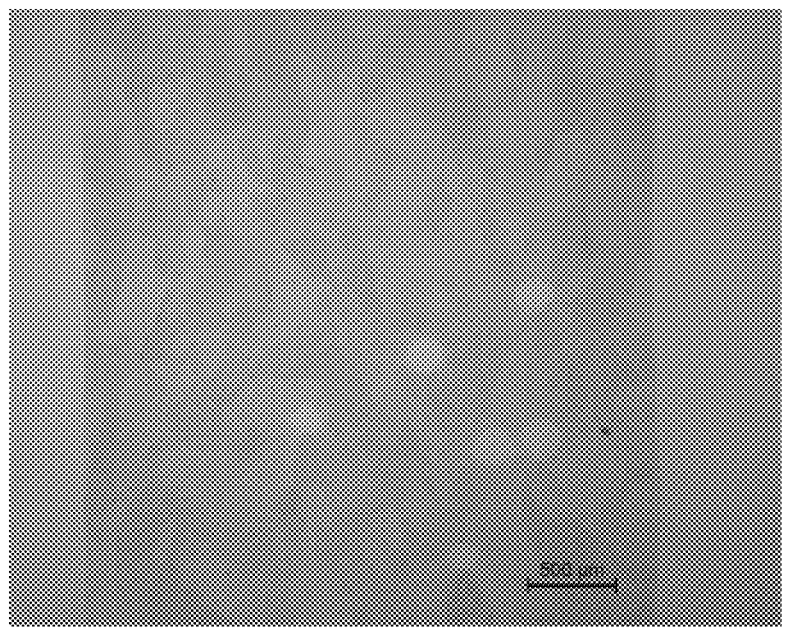
FIG. 3 represents a picture using bright field (BF) illumination of microtomed cross-section of a rotomoulded sample prepared using composition 1 (Global section 2×2.5).
Figure 4:
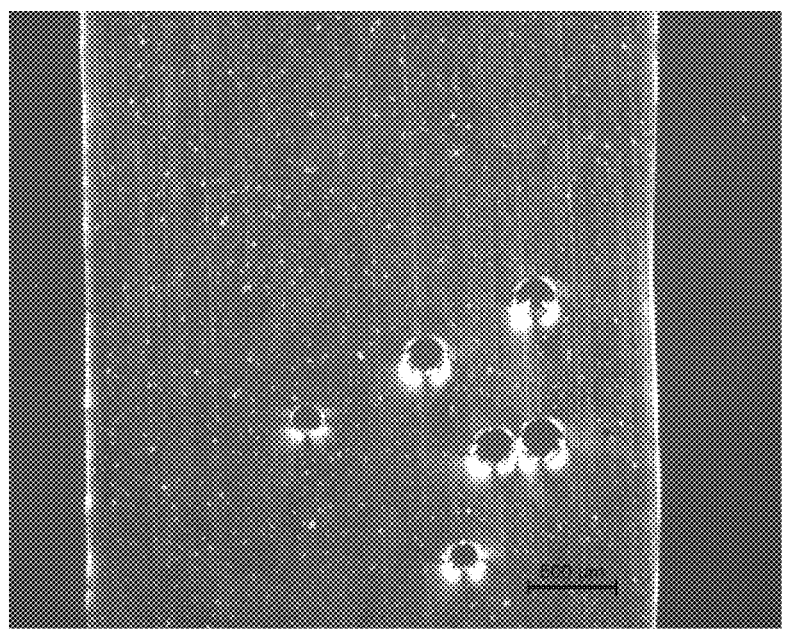
FIG. 4 represents a picture using polarized light (PL) illumination of microtomed cross-section of a rotomoulded sample prepared using composition 1 (Global section 2×2.5).
Figure 5:
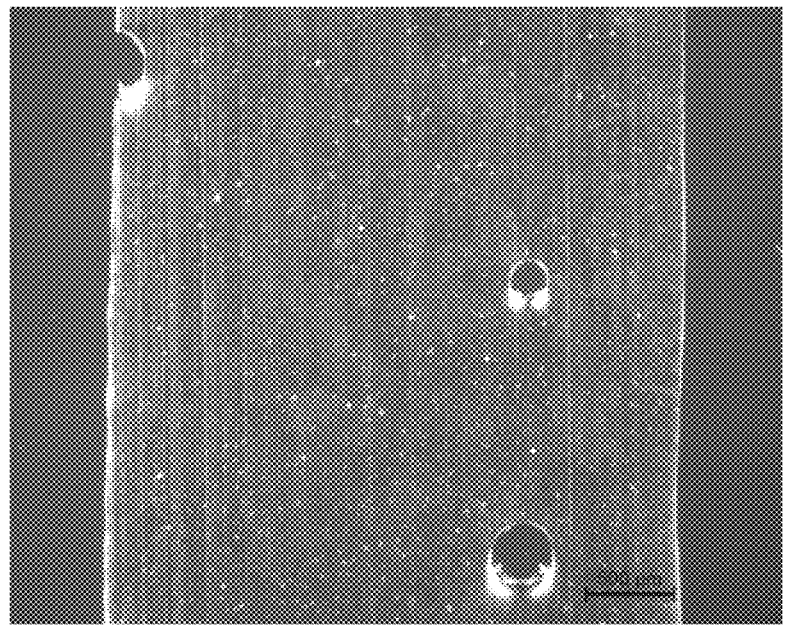
FIG. 5 represents a picture using polarized light (PL) illumination of microtomed cross-section of a rotomoulded sample prepared using composition 1 (Global section 2×2.5).
Figure 6:
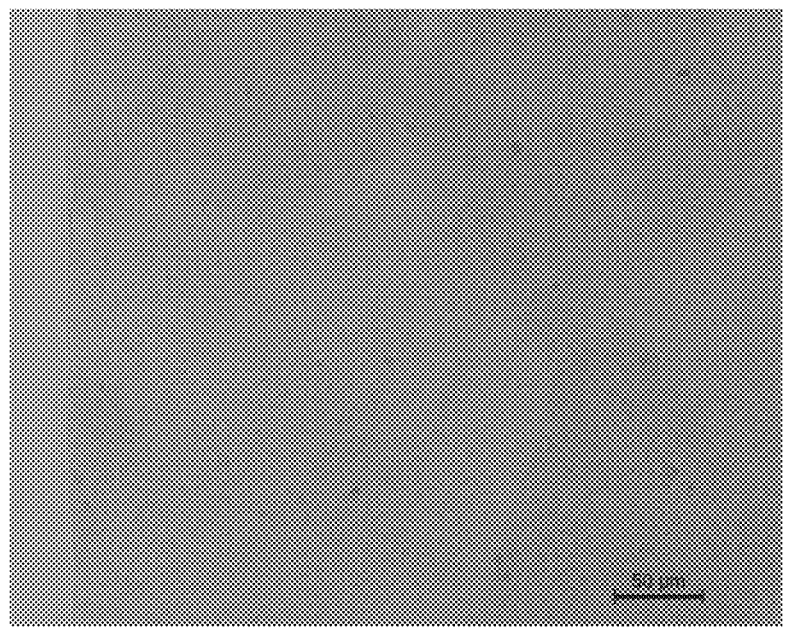
FIG. 6 represents a picture using bright field (BF) illumination of microtomed cross-section taken from inner zone (internal zone) of a rotomoulded sample prepared using composition 1 (inner zone 2×2.5).
Figure 7:
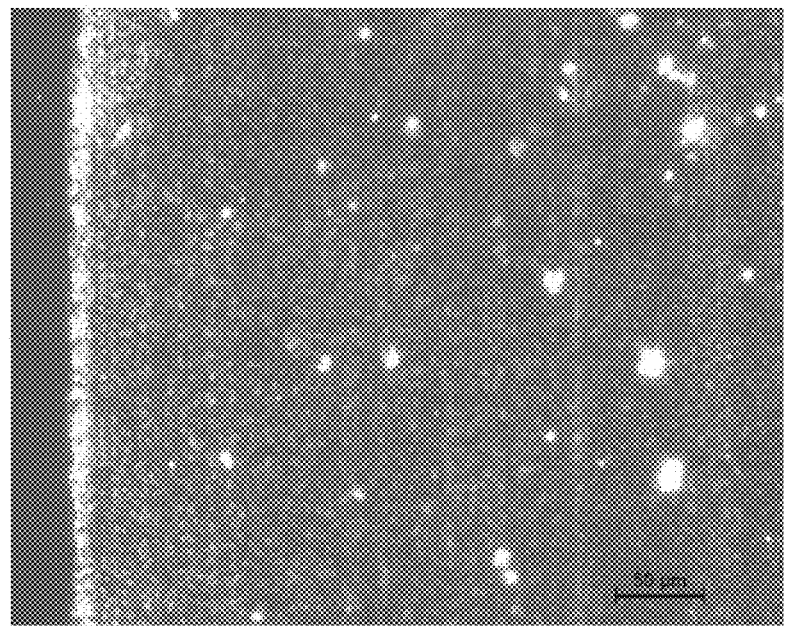
FIG. 7 represents a picture using polarized light (PL) of microtomed cross-section taken from inner zone (internal zone) of a rotomoulded sample prepared using composition 1 (inner zone 2×2.5).
Figure 8:
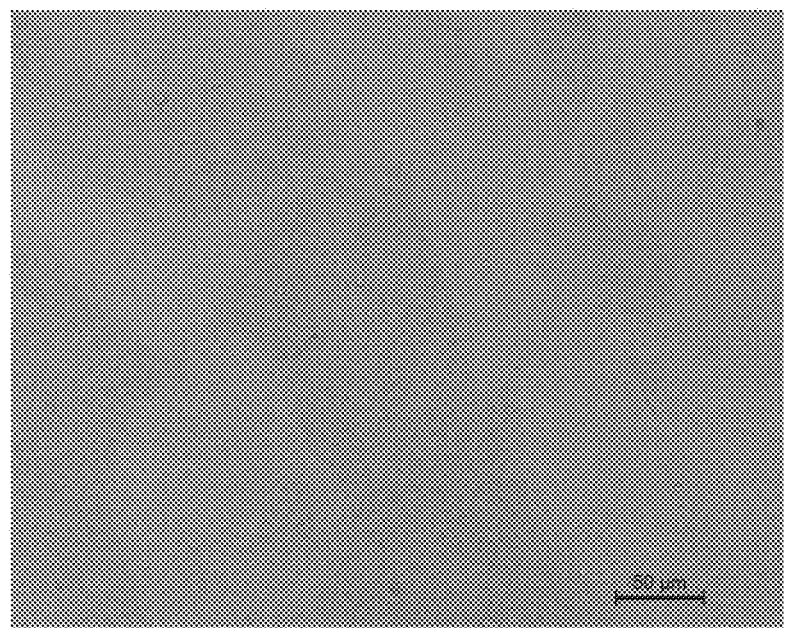
FIG. 8 represents a picture using bright field (BF) illumination of microtomed cross-section taken from middle zone of a rotomoulded sample prepared using composition 1 (Middle zone 2×2.5).
Figure 9:
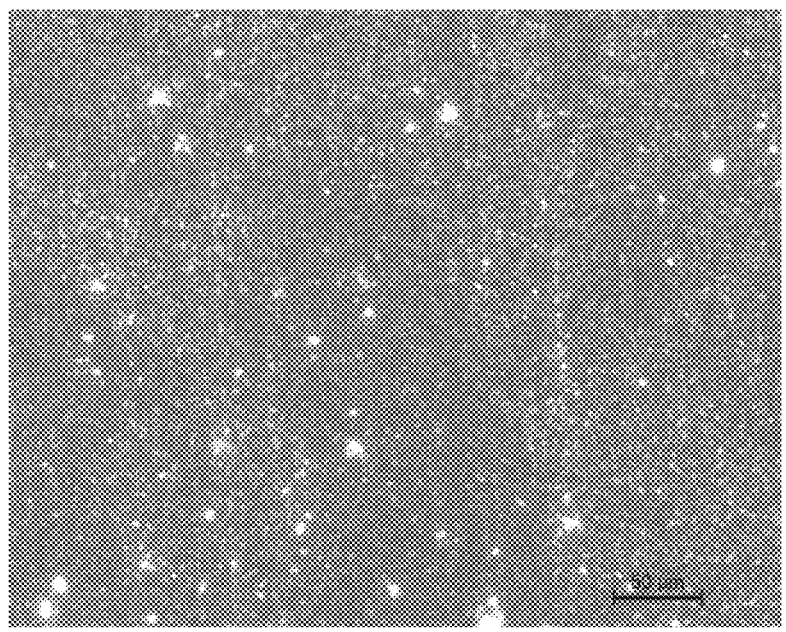
FIG. 9 represents a picture using polarized light (PL) of microtomed cross-section taken from middle zone of a rotomoulded sample prepared using composition 1 (Middle zone 2×2.5).
Figure 10:
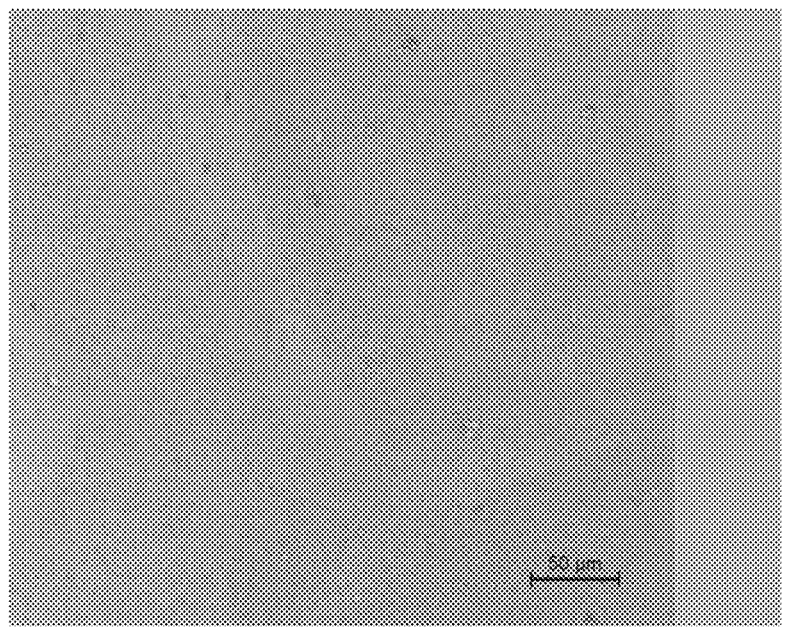
FIG. 10 represents a picture using bright field (BF) illumination of microtomed cross-section taken from the outer zone of a rotomoulded sample prepared using composition 1 (outer zone 2×2.5).
Figure 11:
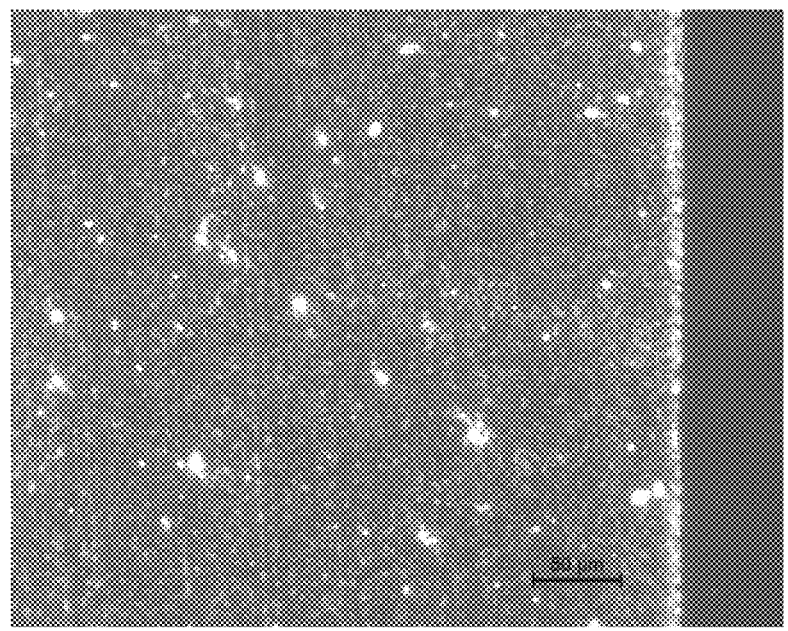
FIG. 11 represents a picture using polarized light (PL) of microtomed cross-section taken from the outer zone of a rotomoulded sample prepared using composition 1 (outer zone 2×2.5).
Figure 12:
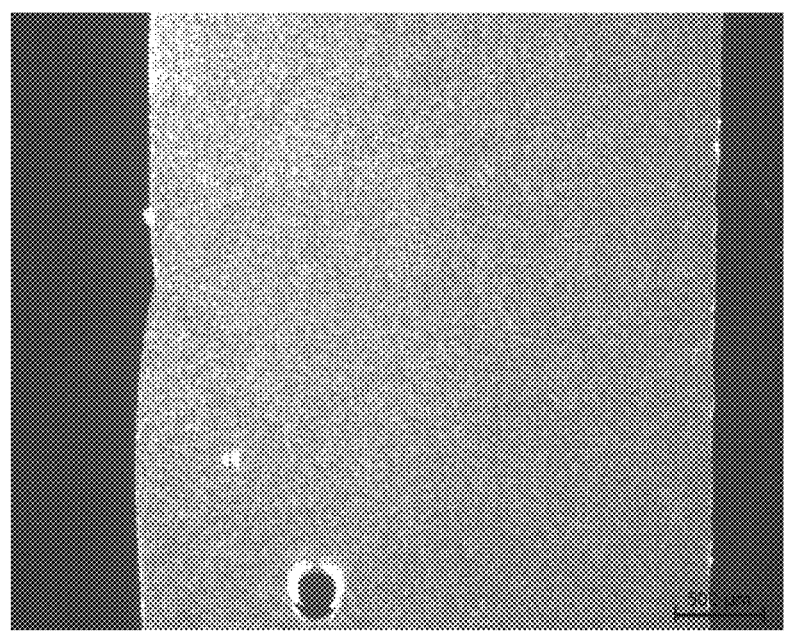
FIG. 12 represents a picture using polarized light (PL) illumination of microtomed cross-section of a rotomoulded sample prepared using composition 2 (Global section 2×2.5).
Figure 13:
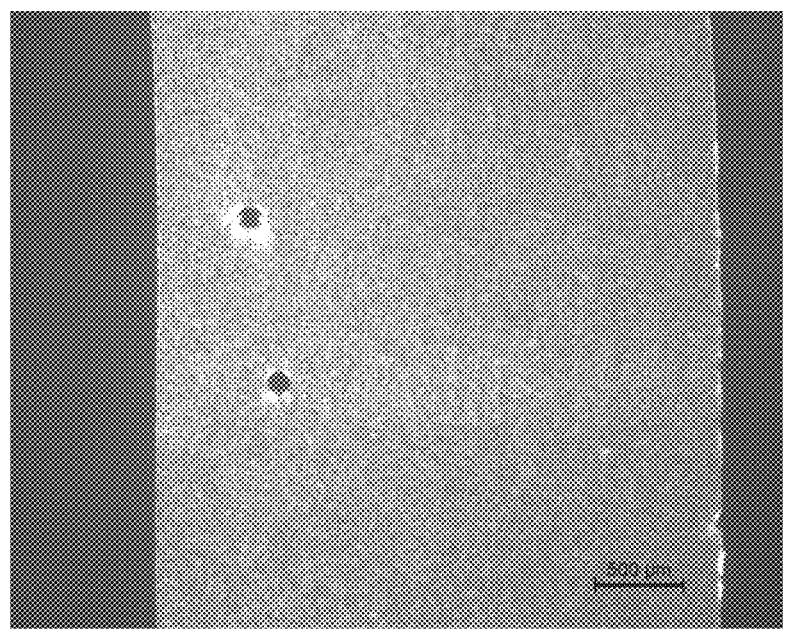
FIG. 13 represents a picture using polarized light (PL) illumination of microtomed cross-section of a rotomoulded sample prepared using composition 2 (Global section 2×2.5).
Figure 14:
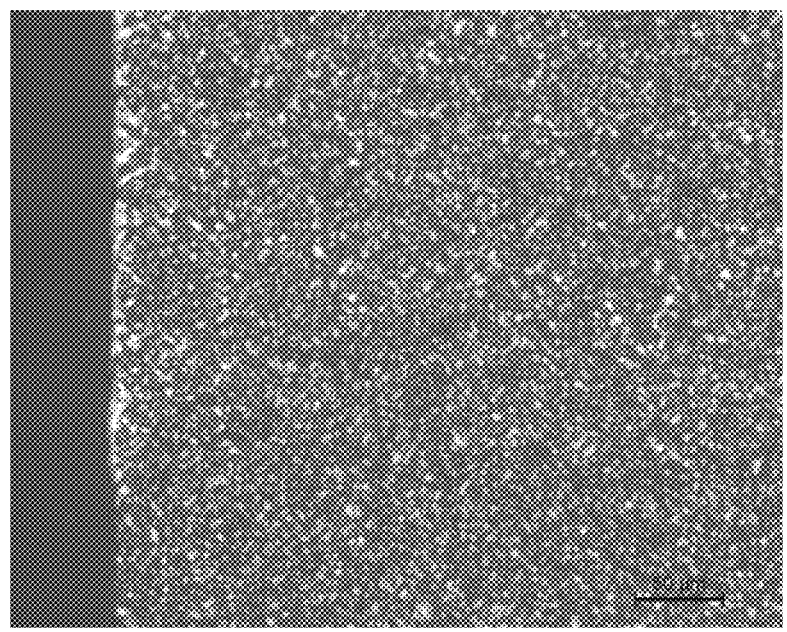
FIG. 14 represents a picture using polarized light (PL) of microtomed cross-section taken from inner zone (internal zone) of a rotomoulded sample prepared using composition 2 (inner zone 2×2.5).
Figure 15:
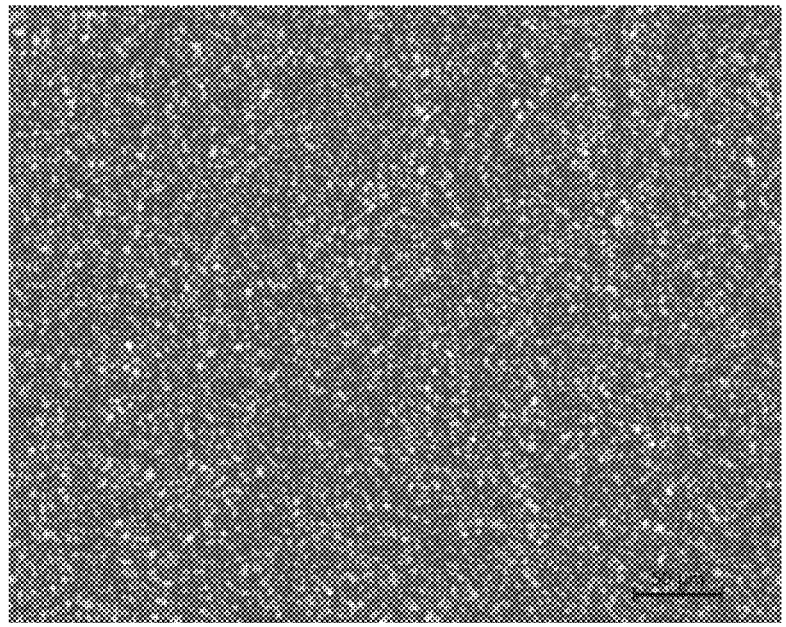
FIG. 15 represents a picture using polarized light (PL) of microtomed cross-section taken from middle zone of a rotomoulded sample prepared using composition 2 (Middle zone 2×2.5).
Figure 16:
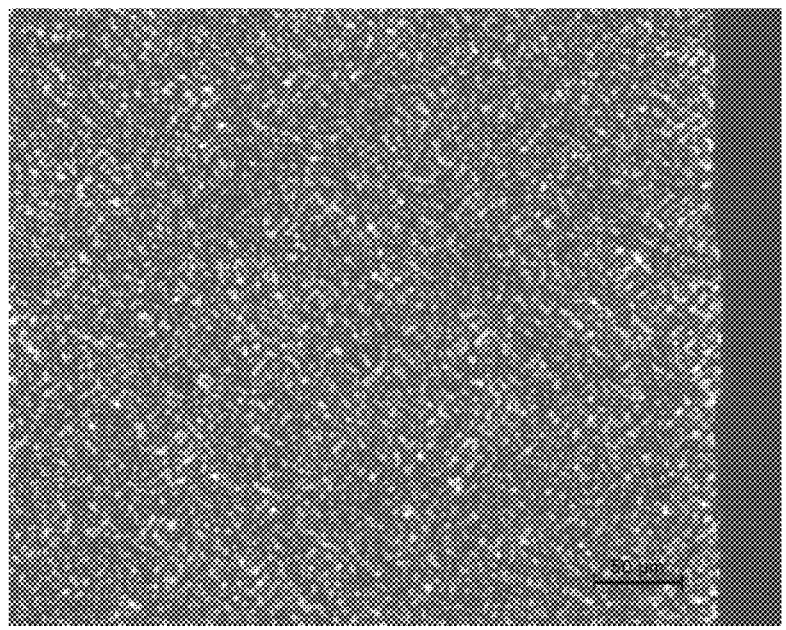
FIG. 16 represents a picture using polarized light (PL) of microtomed cross-section taken from the outer zone of a rotomoulded sample prepared using composition 2 (outer zone 2×2.5).

From FIGS. 1 and 2, it can be seen that the presence of ionomer in the composition 2 has a slowing effect on the pH reduction, when compared to composition 1. The blend used to prepare layer A according to the invention have the advantages of preserving the PLA present in the blend from hydrolysis. The presence of an ionomer (Surlyn®) therefore also improves the resistance of the composition to hydrolysis.

Example 3

Composition 1 and composition 2 as mentioned in Example 1 were used separately to form bottles as described in Example 1. The dispersion of the PLA nodules in the PE matrix was assessed on microtomed cross-sections of the samples using bright field (BF) illumination, and polarized light (PL), using an Olympus BH2 microscope fitted with a digital camera. The results are shown in FIGS. 3 to 16.

From FIGS. 3 to 11, it can be seen that the cross-sections of the sample are showing a uniform spherulitic structure. Some voids are observed in the sample.

From FIGS. 12 to 16, it can be seen that the cross-sections of the sample are showing a uniform spherulitic structure with an average spherulitic size of 12.2±0.5 μm. Some voids are observed in the sample.

When comparing FIGS. 3 to 11 with FIGS. 12 to 16, it is clear that for sample prepared using composition 1 <<spots>> of PLA are observed, as well as a bad dispersion.

The samples prepared with composition 2 are more homogeneous. In the samples obtained from composition 2, the dispersion of PLA nodules in the PE matrix was improved with respect to the samples obtained from composition 1.

Example 4

Figure 17:
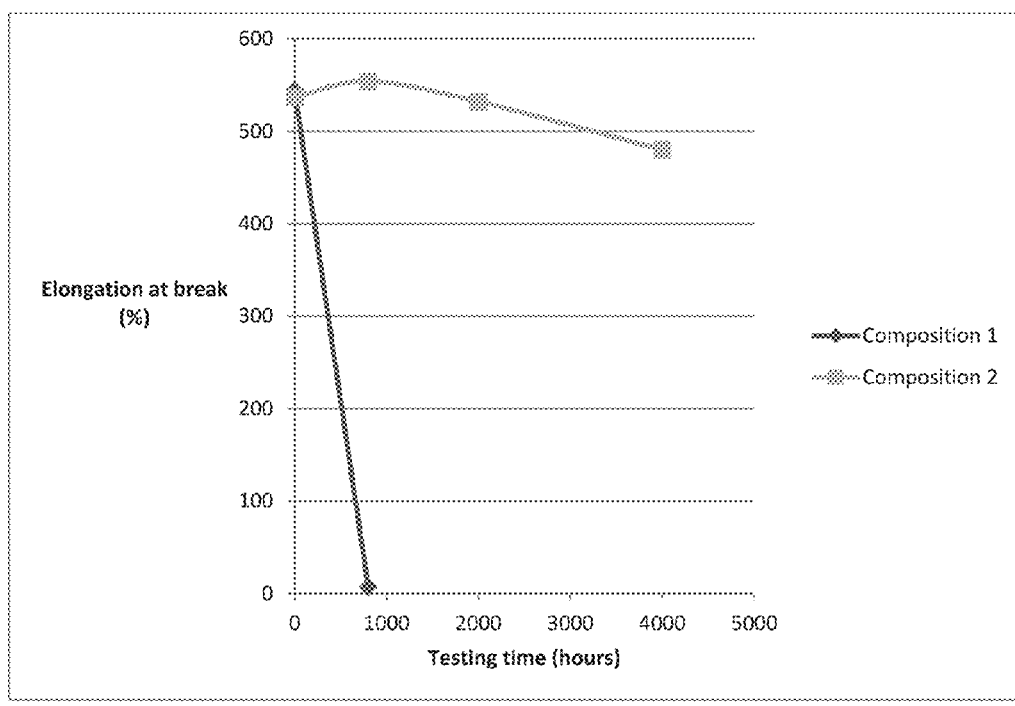
FIG. 17 represents a graph plotting the elongation percentage at break over time for compositions 1 and 2.

In this example, dumbbell shape specimens according to type 1B of ISO 527-2 method were prepared with the compositions 1 and 2 as disclosed in example 1 and subjected to an artificial weathering and ageing according to DIN 53387-1-A-X in an ATLAS® Xenon Weatherometer Ci35A for testing time according to FIG. 17 under the following conditions:

Irradiance at 340 nm: 0.47 W/m$^2$,
Filter combination: inner: boro S/outer: boro S,
Black standard temperature: 65° C.,
Mode of operation: continue light on, cycle 102 min light, 18 min wetting of samples, relative humidity: 60-80%, samples were sprayed with water.

The elongation at break according to ISO 527-1 and 527-2/1B/50 was tested on the dumbbell shape specimens. From FIG. 17, it can be seen that the presence of ionomer (Surlyn®) in concentration as low as 1 wt % in the composition 2 allows getting better result in term of elongation at break after artificial weathering and ageing, when compared to composition 1. This is particularly advantageous.

The invention claimed is:

1. A rotomoulded article comprising one or more layers, wherein a layer A comprises:
   from 50 to 99.4 wt % of a polyolefin;
   from 0.5 to 50 wt % of a polyester, wherein said polyester is an aliphatic polyester selected from poly(lactic acid), polyhydroxyalkanoate, polycaprolactone, copolyesters and polyesteramides;
   from 0.1 to 20 wt % of a ter-polymer, comprising:
      (a) 50 to 99.9 wt % of an ethylene or a styrene monomer,
      (b) 0.1 to 50 wt % of an unsaturated anhydride-, epoxide- or carboxylic acid-containing monomer,
      (c) 0 to 50 wt % (meth)acrylic ester monomer; and
   from 0.1 to 20 wt % of a random poly(ethylene-co-acrylic acid derivative) ionomer.

2. The rotomoulded article according to claim 1, wherein the polyester is a poly(lactic acid).

3. The rotomoulded article according to claim 1, wherein the polyolefin is a polyethylene.

4. The rotomoulded article according to claim 1, wherein said ionomer is a copolymer comprising
   from about 50 wt % to about 99.8 wt % copolymerized with:
   from about 0.2 wt % to about 30 wt % of one or more monomers selected from the group comprising methacrylic acid, acrylic acid, and ethacrylic acid.

5. The rotomoulded article according to claim 1, wherein the rotomoulded article is a bottle, a can, a tank or a car part.

6. The rotomoulded article according to claim 1, wherein the rotomoulded article is a car door or car body.

7. A rotomoulded article comprising one or more layers, wherein a layer A comprises:
   from 50 to 99.4 wt % of a polyolefin;
   from 0.5 to 50 wt % of a polyester, wherein said polyester is a first aliphatic polyester selected from poly(lactic acid), polyhydroxyalkanoate, polycaprolactone, copolyesters and polyesteramides;
   from 0.1 to 20 wt % of a first co- or ter-polymer, comprising:
      (a) 50 to 99.9 wt % of a first ethylene or a styrene monomer,
      (b) 0.1 to 50 wt % of a first unsaturated anhydride-, epoxide- or carboxylic acid-containing monomer,
      (c) 0 to 50 wt % a first (meth)acrylic ester monomer; and
   from 0.1 to 20 wt % of a random poly(ethylene-co-acrylic acid derivative) ionomer; and
   a layer B1 adjacent to layer A and comprising:
   from 50 to 99.9 wt % of aft second aliphatic polyester selected from polyhydroxyalkanoate, poly(lactic acid), polycaprolactone, copolyesters and polyesteramides; and
   from 0.1 to 10 wt % of a second co- or ter-polymer, comprising:
      (a) 50 to 99.9 wt % of a second ethylene or a styrene monomer,
      (b) 0.1 to 50 wt % of a second unsaturated anhydride-, epoxide- or carboxylic acid-containing monomer,
      (c) 0 to 50 wt % a second (meth)acrylic ester monomer; and
   wherein layer B1 has a different composition than layer A.

8. The rotomoulded article according to claim 7, wherein the first and second aliphatic polyesters are poly(lactic acid).

9. The rotomoulded article according to claim 7, wherein said rotomoulded article comprises at least one cavity provided with polyurethane adhered to layer B1.

10. The rotomoulded article of claim 7, wherein the ionomer comprises: from about 50 wt % to about 99.8 wt % ethylene copolymerized with from about 1 wt % to about 20 wt % of one or more monomers selected from the group comprising methacrylic acid and acrylic acid.

11. The rotomoulded article of claim 7, wherein the ionomer is a random poly(ethylene-co-methacrylic acid) copolymer.

12. A rotomoulded article comprising one or more layers, wherein a layer A comprises:
   from 50 to 99.4 wt % of a first polyolefin;
   from 0.5 to 50 wt % of a first polyester, wherein said first polyester is a first aliphatic polyester selected from poly(lactic acid), polyhydroxyalkanoate, polycaprolactone, copolyesters and polyesteramides;
   from 0.1 to 20 wt % of a first co- or ter-polymer, comprising:
      (a) 50 to 99.9 wt % of a first ethylene or a styrene monomer,
      (b) 0.1 to 50 wt % of a first unsaturated anhydride-, epoxide- or carboxylic acid-containing monomer,
      (c) 0 to 50 wt % a first (meth)acrylic ester monomer; and
   from 0.1 to 20 wt % of a random poly(ethylene-co-acrylic acid derivative) ionomer; and
   a layer B adjacent to layer A and comprising:
   from 50 to 99.5 wt % of aft second polyolefin;
   from 0.5 to 50 wt % of a second polyester; and
   from 0 to 15 wt % of a second co- or ter-polymer, comprising:
      (a) 50 to 99.9 wt % of a second ethylene or a styrene monomer,
      (b) 0.1 to 50 wt % of a second unsaturated anhydride-, epoxide- or carboxylic acid-containing monomer,
      (c) 0 to 50 wt % a second (meth)acrylic ester monomer; and
   wherein layer B has a different composition than layer A.

13. The rotomoulded article according to claim 12, wherein the second polyolefin of layer B is a polyethylene.

14. The rotomoulded article according to claim 12, wherein said layer B is foamed.

15. The rotomoulded article of claim 12, wherein the ionomer comprises: from about 50 wt % to about 99.8 wt % ethylene copolymerized with from about 1 wt % to about 20 wt % of one or more monomers selected from the group comprising methacrylic acid and acrylic acid.

16. The rotomoulded article of claim 12, wherein the ionomer is a random poly(ethylene-co-methacrylic acid) copolymer.

17. The rotomoulded article of claim 12 further comprising a layer C, wherein layer B is between and adjacent to layers A and C, wherein each of layers A, B, and C have different compositions; wherein layer C comprises:
   from 50 to 99.5 wt % of a third polyolefin;
   from 0.5 to 50 wt % of a third polyester, wherein said third polyester is a third aliphatic polyester selected from poly(lactic acid), polyhydroxyalkanoate, polycaprolactone, copolyesters and polyesteramides;
   from 0 to 20 wt % of a third co- or ter-polymer, comprising:
      (a) 50 to 99.9 wt % of a third ethylene or a styrene monomer,
      (b) 0.1 to 50 wt % of a third unsaturated anhydride-, epoxide- or carboxylic acid-containing monomer,
      (c) 0 to 50 wt % a third (meth)acrylic ester monomer.

* * * * *